United States Patent
Marx et al.

(10) Patent No.: US 11,046,587 B2
(45) Date of Patent: Jun. 29, 2021

(54) PROCESS FOR A CONTINUOUS SYNTHESIS OF ZEOLITIC MATERIALS

(71) Applicant: BASF SE, Ludwigshafen am Rhein (DE)

(72) Inventors: Stefan Marx, Ludwigshafen (DE); Stefanie Clade, Ludwigshafen (DE); Lena Arnold, Brasschaat (BE); Uwe Diehlmann, Hassloch (DE); Ulrich Mueller, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 147 days.

(21) Appl. No.: 16/308,928

(22) PCT Filed: Jun. 14, 2017

(86) PCT No.: PCT/EP2017/064567
§ 371 (c)(1),
(2) Date: Dec. 11, 2018

(87) PCT Pub. No.: WO2017/216236
PCT Pub. Date: Dec. 21, 2017

(65) Prior Publication Data
US 2019/0144290 A1    May 16, 2019

(30) Foreign Application Priority Data
Jun. 17, 2016   (EP) .................................... 16174896

(51) Int. Cl.
*C01B 39/02*    (2006.01)
*C01B 39/48*    (2006.01)
(Continued)

(52) U.S. Cl.
CPC .......... *C01B 39/48* (2013.01); *B01D 53/9418* (2013.01); *B01J 19/0013* (2013.01);
(Continued)

(58) Field of Classification Search
CPC ...... C01B 39/02; C01B 39/48; B01J 19/2415; B01J 29/06; B01J 29/7015; B01J 29/763; B01J 2219/00033; B01D 53/9418
See application file for complete search history.

(56) References Cited

U.S. PATENT DOCUMENTS

| 3,425,800 | A |   | 2/1969 | Hirsh |
| 3,567,521 | A | * | 3/1971 | Toy et al. .............. B05D 3/044 428/422 |

(Continued)

FOREIGN PATENT DOCUMENTS

DE    39 19 400 A1    1/1991

OTHER PUBLICATIONS

Liu et al, "Widening Synthesis Bottlenecks:Realization of UltrafastandContinuous-FlowSynthesis of High-Silica Zeolite SSZ-13 for NOxRemoval", Angew.Chem. Int.Ed. 2015, 54,5683-5687 (Year: 2015).*

(Continued)

*Primary Examiner* — David M Brunsman
(74) *Attorney, Agent, or Firm* — Lowenstein Sandler LLP

(57) ABSTRACT

A continuous process for preparing a zeolitic material comprising (i) preparing a mixture comprising a source of $YO_2$, optionally a source of $X_2O_3$, and a liquid solvent system; (ii) continuously feeding the mixture prepared in (i) into a continuous flow reactor at a liquid hourly space velocity in the range of from 0.3 to 20 $h^{-1}$ for a duration of at least 1 h; and (iii) crystallizing the zeolitic material from the mixture in the continuous flow reactor, wherein the mixture is heated to a temperature in the range of from 100 to 300° C.; wherein the volume of the continuous flow reactor is in the range of from 150 $cm^3$ to 75 $m^3$, as well as to zeolitic materials which may be obtained according to the inventive process and to their use.

19 Claims, 8 Drawing Sheets

(51) Int. Cl.
| | |
|---|---|
| B01D 53/94 | (2006.01) |
| B01J 29/06 | (2006.01) |
| B01J 29/70 | (2006.01) |
| B01J 29/76 | (2006.01) |
| C01B 39/04 | (2006.01) |
| B01J 29/072 | (2006.01) |
| B01J 19/00 | (2006.01) |
| B01J 19/18 | (2006.01) |
| B01J 37/32 | (2006.01) |
| B01J 37/00 | (2006.01) |
| B01J 29/86 | (2006.01) |
| B01J 29/87 | (2006.01) |

(52) U.S. Cl.
CPC ........... *B01J 19/1812* (2013.01); *B01J 29/06* (2013.01); *B01J 29/061* (2013.01); *B01J 29/072* (2013.01); *B01J 29/7015* (2013.01); *B01J 29/763* (2013.01); *C01B 39/02* (2013.01); *C01B 39/04* (2013.01); *B01J 29/86* (2013.01); *B01J 29/87* (2013.01); *B01J 37/0045* (2013.01); *B01J 37/32* (2013.01); *B01J 2219/00033* (2013.01); *B01J 2219/00099* (2013.01); *B01J 2219/00162* (2013.01); *B01J 2219/00164* (2013.01); *B01J 2229/186* (2013.01); *B01J 2229/36* (2013.01); *B01J 2229/42* (2013.01); *C01P 2002/72* (2013.01)

(56) References Cited

U.S. PATENT DOCUMENTS

| | | | |
|---|---|---|---|
| 4,935,215 | A | 6/1990 | Krishnamurthy |
| 5,989,518 | A | 11/1999 | Tannous et al. |
| 2001/0054549 | A1 | 12/2001 | Park et al. |
| 2011/0076229 | A1 | 3/2011 | Trukhan et al. |
| 2016/0115039 | A1 | 4/2016 | Okubo et al. |

OTHER PUBLICATIONS

International Search Report and Written Opinion dated Jul. 7, 2017 in PCT/EP2017/064567.
Zhendong Liu, et al., "Widening Synthesis Bottlenecks: Realization of Ultrafast and Continuous-Flow Synthesis of High-Silica Zeolite SSZ-13 for NO$_x$ Removal", Angew. Chemie Int. Ed., vol. 54, 2015, pp. 5683-5687.
Jingxi Ju, et al., "Continuous synthesis of zeolite NaA in a microchannel reactor", Chemical Engineering Journal, vol. 116, 2006, pp. 115-121.
Tobias Vandermeersch, et al., "A continuous flow reactor setup as a tool for rapid synthesis of micron sized NaA zeolite", Microporous and Mesoporous Materials, vol. 226, 2016, pp. 133-139.
Zhendong Liu, et al., "Ultrafast Continuous-Flow Synthesis of Crystalline Microporous Aluminophosphate AlPO$_4$-5", Chemistry of Materials, vol. 26, 2014, pp. 2327-2231.
P.M. Slangen, et al., "Continuous Synthesis of Zeolites using a Tubular Reactor", 12$^{th}$ International Zeolite Conference, Materials Research Society, 1999, pp. 1553-1560.
L. Bonaccorsi, et al., "Influence of process parameters in microwave continuous synthesis of zeolite LTA", Microporous and Mesoporous Materials, vol. 112, 2008, pp. 401-493.
C.S. Cundy, et al., "Zeolite synthesis using a semicontinous reactor, Part 1: Controlled nucleation and growth of ZSM-5 crystals having well-defined morphologies", Zeolites, vol. 15, No. 4, XP004033587, May 1995, pp. 353-372.
International Preliminary Report on Patentability dated Dec. 27, 2018 in PCT/EP2017/064567.
U.S. Appl. No. 16/060,739, filed Dec. 20, 2018, 2018/0362357, Feyen, et al.
U.S. Appl. No. 15/509,527, filed Mar. 8, 2017, US 2017/0246620 A1, Andrei-Nicolae Parvulescu.
U.S. Appl. No. 15/550,581, filed Aug. 11, 2017, US 2018/0036723 A1, Dominic Riedel.
U.S. Appl. No. 15/316,220, filed Dec. 5, 2016, US 2018/0134570 A1, Stefan Maurer.
U.S. Appl. No. 16/202,918, filed Nov. 28, 2018, Stefan Maurer.
U.S. Appl. No. 15/549,905, filed Aug. 9, 2017, US 2018/0022611 A1, Mathias Feyen.
U.S. Appl. No. 15/752,991, filed Feb. 15, 2018, US 2018/0243691 A1, Ulrich Mueller.
U.S. Appl. No. 15/518,945, filed Apr. 13, 2017, US 2017/0225959 A1, Stefan Maurer.
U.S. Appl. No. 15/524,484, filed May 4, 2017, US 2017/0336030 A1, Matthias Weickert.
U.S. Appl. No. 15/779,218, filed May 25, 2018, US 2018/0345245 A1, Stefan Maurer.
U.S. Appl. No. 15/508,725, filed Mar. 3, 2017, US 2017/0275076 A1, Todd Edgington.
U.S. Appl. No. 15/521,924, filed Apr. 26, 2017, US 2018/0230117 A1, Joaquim Henrique Teles.
U.S. Appl. No. 15/744,324, filed Jan. 12, 2018, US 2018/0208532 A1, Andrei-Nicolae Parvulescu.
U.S. Appl. No. 16/086,251, filed Sep. 18, 2018, Benedikt Kalo.
U.S. Appl. No. 15/571,107, filed Nov. 1, 2017, US 2018/0170850 A1, Nicolas Vautravers.
U.S. Appl. No. 15/779,314, filed May 25, 2018, US 2018/0333696 A1, Julia Burckhart.
U.S. Appl. No. 16/060,260, filed Jun. 7, 2018, US 2018/0362353 A1, Nicolas Vautravers.
U.S. Appl. No. 16/076,600, filed Aug. 8, 2018, Dominic Riedel.
U.S. Appl. No. 16/308,730, filed Dec. 10, 2018, Natalia Trukhan.
U.S. Appl. No. 15/775,657, filed May 11, 2018, US 2018/0328601 A1, Matthias Weickert.
U.S. Appl. No. 16/060,739, filed Jun. 8, 2018, US 2018/0362357 A1, Mathias Feyen.
U.S. Appl. No. 16/069,206, filed Jul. 11, 2018, US 2019/0001279 A1, Dietrich Scherzer.
U.S. Appl. No. 16/060,229, filed Jun. 7, 2018, US 2018/0362351 A1, Andrei-Nicolae Parvulescu.
U.S. Appl. No. 16/304,511, filed Nov. 26, 2018, Mathias Feyen.

* cited by examiner

PROCESS FOR A CONTINUOUS SYNTHESIS OF ZEOLITIC MATERIALS

This application is a national stage 371 filing of PCT/EP2017/064567, filed 14 Jun. 2017.

TECHNICAL FIELD

The present invention relates to a continuous process for the preparation of a zeolitic material, as well as to a catalyst per se as obtainable or obtained according to said process. Furthermore, the present invention relates to the use of the inventive zeolitic material, in particular as a catalyst.

INTRODUCTION

The synthesis of zeolitic materials from simple starting compounds and involves a complex process of self organization which often necessitates special conditions such as elevated temperatures and/or pressure, wherein such reactions typically require the heating of starting materials under autogenous pressure for obtaining the zeolitic material after lengthy reaction times ranging from days to several weeks. Accordingly, due to the often harsh reaction conditions and the long reaction times, batch synthesis has long been the method of choice for synthesizing zeolitic materials. Batch reactions however present numerous limitations, in particular relative to the levels of space-time-yield which may be attained.

Efforts have accordingly been invested in finding improved batch reaction procedures as well as alternative methodologies which offer advantages to the classical batch synthetic procedures employed for the synthesis of zeolitic materials. One method which has been investigated in this respect involves the use of continuous stirred-tank reactors wherein the fluid reagents are continuously introduced at the top of a tank reactor, and the effluent containing the solid reaction product is continuously removed from the bottom of the tank reactor. Although said methodologies eliminate the need to empty the reaction vessel between batch runs under non-continuous conditions, the reaction times necessary for crystallization remain lengthy.

For increasing the efficiency of continuous stirred-tank reactors, these are often employed in series, wherein each stage contributes to a given incremental progress of the reaction to completion. The more stages which are employed, the higher the efficiency which may be attained, maximum efficiency being theoretically realized by an infinite number of infinitely small reaction stages. Besides in continuous stirred-tank reactors, the concept of multiple stages has also been realized e.g. in multiple stage cylindrical reactors such as disclosed in U.S. Pat. No. 5,989,518 for the synthesis of a 4A zeolite.

Along these lines, reactor geometries have been conceived which allow for a rapid synthesis of zeolitic materials. Thus, US 2016/0115039 A1 relates to a method for the continuous production of a zeolite in a tubular reactor displaying a low ratio of the volume to the lateral surface area.

Similarly, Liu et al. in Angew. Chem. Int. Ed. 2015, 54, 5683-5687 discloses a continuous synthesis of high-silica zeolite SSZ-13 employing very short reaction times. Ju, J. et al. in Chemical Engineering Journal 2006, 116, 115-121 as well as Vandermeersch, T. et al. in Microporous and Mesoporous Materials 2016, 226, 133-139, on the other hand, respectively disclose the rapid synthesis of micron sized NaA zeolite in a continuous flow reactor setup. Liu, Z. et al. in Chemistry of Materials 2014, 26, 2327-2331 concerns an ultrafast continuous-flow synthesis of crystalline microporous aluminophophate $AlPO_4$-5. Slangen et al. "Continuous Synthesis of Zeolites using a Tubular Reactor", $12^{th}$ International Zeolite Conference, Materials Research Society 1999 relates to the continuous syntheses of NaA zeolite, NaY zeolite, and silicalite-1 in a tubular reactor of 6 mm outer diameter (~3 mm inner diameter) and variable length.

For reactions which do not necessitate high pressure, microwave-assisted procedures have been investigated such as Bonaccorsi, L. et al. in Microporous and Mesoporous Materials 2008, 112, 481-493 which relates to the continuous synthesis of zeolite LTA. Similarly, US 2001/0054549 A1 concerns a continuous process and apparatus for preparing inorganic materials employing microwaves.

Although considerable progress has been made relative to the reaction efficiency in view of the use of continuous stirred-tank and multiple stage reactors, progress made in view of the reduction of the reaction times has been limited to reactor geometries applied on a lab-scale level. Furthermore, although in principle continuous, efforts made with respect to the reduction of reaction times remain limited with respect to economically viable durations of operation due to the clogging of the reactor, in particular in applications employing plug flow methodologies.

In this respect, DE 39 19 400 A1 describes a hydrothermal pre-treatment of a batch reaction mixture in a tubular reactor prior to crystallization thereof in a batch reactor for at least 40 h reaction time at ambient pressure on an industrial scale. There however remains the need to employ such flow reactor techniques not only as part of batch methodologies but to continuous processes wherein the crystallization takes place within the flow reactor without being limited to short operation periods in view of clogging issues.

DETAILED DESCRIPTION

It was therefore an object of the present invention to provide an improved continuous process for preparing a zeolitic material which allows for extended periods of uninterrupted operation, in particular on an industrial scale. Thus, it has surprisingly been found that by applying a specific range of liquid hourly space velocities to continuous flow reactors displaying a sufficient volume allows for an improved process, in particular relative to the levels of space-time-yield which may be attained. In particular, it has quite unexpectedly been found that the products resulting from such a process display improved properties, in particular relative to their purity and crystallinity.

Therefore, the present invention relates to a continuous process for preparing a zeolitic material comprising (i) preparing a mixture comprising a source of $YO_2$, optionally a source of $X_2O_3$, and a liquid solvent system;

(ii) continuously feeding the mixture prepared in (i) into a continuous flow reactor at a liquid hourly space velocity in the range of from 0.3 to 20 $h^{-1}$ for a duration of at least 1 h; and (iii) crystallizing the zeolitic material from the mixture in the continuous flow reactor, wherein the mixture is heated to a temperature in the range of from 100 to 300° C.; wherein the volume of the continuous flow reactor is in the range of from 150 $cm^3$ to 75 $m^3$.

As regards the liquid hourly space velocity in the continuous flow reactor, no particular restrictions apply such that in principle any conceivable liquid hourly space velocity may be chosen for conducting the inventive process, provided that it is comprised the range of from 0.3 to 20 $h^{-1}$.

Thus, by way of example, the liquid hourly space velocity may be in the range of anywhere from 0.5 to 16, wherein preferably the inventive process is conducted at a liquid hourly space velocity of from 1 to 14 $h^{-1}$, more preferably from 2 to 12 $h^{-1}$, more preferably from 3 to 10 $h^{-1}$, more preferably from 3.5 to 8 $h^{-1}$, and more preferably from 4 to 6 $h^{-1}$. It is, however, particularly preferred according to the present invention that the mixture prepared in (i) is continuously fed into a continuous flow reactor at a liquid hourly space velocity the range of from 4.5 to 5.5 $h^{-1}$.

According to the present invention, there is in principle no restriction as to the fashion in which the mixture prepared in (i) is conducted through the continuous flow reactor, such that the liquid may adopt a laminar flow and/or may be subject to turbulence during its transition through the reactor. For achieving an increased mass and heat transfer, it is however preferred according to the present invention that mixture prepared in (i) is conducted through the continuous flow reactor in (ii) under conditions which are at least in part turbulent. Thus, it is particularly preferred according to the inventive process that depending on the geometry and dimensions of the continuous flow reactor, the liquid hourly space velocity is chosen such as to reach a turbulent state, and in particular a state with Reynolds numbers in excess of 2,500 during at least a portion of the mixture's transition through the continuous flow reactor.

Concerning the means of conducting the mixture prepared in (i) through the continuous flow reactor, in principle, any suitable means may be employed provided that the mixture is allowed to continuously flow through the reactor at a liquid hourly space velocity in the range of from 0.3 to 20 $h^{-1}$. According to the inventive process, it is preferred that the mixture is conducted through the continuous flow reactor by means of one or more pumps with which the mixture is fed into the reactor. As regards the type and number of the one or more pumps which may be employed to this effect, no particular restrictions apply. Thus, by way of example, any one of a syringe pump, a gear pump, a diaphragm pump, and a piston pump may be used to this effect, wherein according to the inventive process it is preferred that a syringe pump is employed for conducting the mixture prepared in (i) through the continuous flow reactor.

As regards the duration of the inventive process, it may be conducted for any conceivable time period without interruption provided that a zeolitic material may be continuously crystallized in (iii). Thus, by way of example, the mixture prepared in (i) may be continuously fed into the continuous flow reactor in (ii) for a duration ranging anywhere from 3 h to 360 d, wherein preferably the mixture prepared in (i) is continuously fed into the continuous flow reactor for a period ranging from 6 h to 120 d, and more preferably from 12 h to 90 d, more preferably from 18 h to 60 d, more preferably from 1 to 30 d, more preferably from 1.5 to 25 d, more preferably from 2 to 20 d, more preferably from 2.5 to 15 d, more preferably from 3 to 12 d, and more preferably from 3.5 to 8 d. According to the inventive process it is particularly preferred that is the mixture prepared in (i) is continuously fed into the continuous flow reactor for a period ranging from 4 to 6 d.

Same applies accordingly relative to the temperature to which the mixture is heated in the continuous flow reactor in (iii) provided that a zeolitic material may be crystallized from the mixture prepared in (i) which is continuously fed therein. Thus, by way of example, the mixture may be heated in (iii) to a temperature ranging anywhere from 100 to 280° C., wherein preferably the zeolitic material is heated to a temperature in the range of from 140 to 260° C., more preferably of from 160 to 250° C., more preferably of from 180 to 240° C., and more preferably of from 190 to 230° C. According to the inventive process it is particularly preferred that the mixture is heated in (iii) to a temperature ranging from 200 to 220° C. for crystallizing the zeolitic material from said mixture.

Concerning the volume of the continuous flow reactor, there is principally no restriction provided that the zeolitic material may be continuously crystallized in (iii) for a duration of at least 1 hour, and preferably for a duration according to any of the particular and preferred embodiments of the inventive process as defined in the present application. To this effect, the volume of the continuous flow reactor is chosen such that it is in the range of anywhere from 150 $cm^3$ to 75 $m^3$. According to the inventive process it is however preferred that the volume of the continuous flow reactor is in the range of from 155 $cm^3$ to 30 $m^3$, and more preferably lies in the range of from 160 $cm^3$ to 10 $m^3$, more preferably from 165 $cm^3$ to 7 $m^3$, more preferably from 170 $cm^3$ to 3 $m^3$, more preferably from 175 $cm^3$ to 1 $m^3$, more preferably from 180 to 700,000 $cm^3$, more preferably from 185 to 500,000 $cm^3$, more preferably from 190 to 300,000 $cm^3$, more preferably from 195 to 100,000 $cm^3$, more preferably from 200 to 70,000 $cm^3$, more preferably from 205 to 50,000 $cm^3$, more preferably from 210 to 30,000 $cm^3$, more preferably from 215 to 10,000 $cm^3$, more preferably from 220 to 7,000 $cm^3$, more preferably from 225 to 5,000 $cm^3$, more preferably from 230 to 3,000 $cm^3$, more preferably from 235 to 1,000 $cm^3$, more preferably from 240 to 700 $cm^3$, and more preferably from 245 to 500 $cm^3$. According to the inventive process it is particularly preferred that the volume of the continuous flow reactor is in the range of from 250 to 300 $cm^3$.

As regards the volume of the continuous flow reactor according to any of the particular and preferred embodiments of the inventive process, there is principally no restriction as to the geometry and dimensions of the reactor volume through which the mixture prepared in (i) is conducted.

Furthermore and independently thereof, said volume may be divided into one or more sub-volumes such that the continuous flow reactor may consist of an array of different and/or identical, and preferably of an array of identical continuous flow reactors arranged such as to allow the mixture prepared in (i) to be divided into different and/or equal, and preferably into equal volumes within the reactor for being reacted in parallel. Therefore, it is particularly preferred according to the present invention that the volume of the continuous flow reactor refers to the sum of the volumes of two or more continuous flow reactors connected in parallel and preferably to the sum of the volumes of two or more identical continuous flow reactors connected in parallel through which accordingly equal volumes of the mixture prepared in (i) are conducted preferably at the same liquid hourly space velocity, and more preferably at the same liquid hourly space velocity wherein the mixture prepared in (i) is heated to the same temperature in the respective continuous flow reactors.

The type of continuous flow reactor which may be employed in the inventive process is not particularly restricted provided that under the chosen conditions it allows for the crystallization of the zeolitic material in (iii). Thus, by way of example, the continuous flow reactor may be selected among a tubular reactor, a ring reactor, and a continuously oscillating reactor, including combinations of two or more thereof, wherein preferably the continuous flow reactor is selected among a plain tubular reactor, a tubular membrane reactor, a tubular reactor with Coanda effect, a ring reactor, and a continuously oscillating baffled reactor. According to the inventive process it is however particularly preferred that the continuous flow reactor is a plain tubular reactor and/or a ring reactor, wherein more preferably the continuous flow reactor is a plain tubular reactor. Although as noted above there is no particular restriction according to the inventive process as to the type of continuous flow reactor which may be employed, it is nevertheless preferred that the continuous flow reactor which is chosen does not comprise a stirred-tank batch reactor, a fed batch reactor, or a continuous-flow stirred-tank reactor, wherein it is particularly preferred according to the inventive process that a continuous flow reactor is chosen for crystallizing the zeolitic material in (iii) which does not comprise a semi batch reactor. Furthermore, within the meaning of the present invention, a "plain tubular reactor" refers to a tubular reactor which does not contain any baffles of any sort placed on the reactor walls and/or within the reactor volume, wherein the reactor has a reactor inlet and a reactor outlet such as to allow for a single passage of the reaction mixture through the reactor from the reactor inlet to the reactor outlet.

As noted in the foregoing, no particular restrictions apply according to the inventive process relative to the particular geometry of the continuous flow reactor and in particular of the volume through which the mixture prepared in (i) is conducted. Thus, in general, it is preferred that the continuous flow reactor is straight and/or comprises one or more curves with respect to the direction of flow, wherein preferably the continuous flow reactor is straight and/or has a coiled form with respect to the direction of flow. Furthermore, and independently thereof, it is preferred according to the inventive process that at least a portion of the tubular reactor is of a regular cylindrical form having a constant inner diameter perpendicular to the direction of flow. Thus, according to said particular and preferred embodiments of the inventive process, the regular cylindrical form is provided perpendicular to the direction of flow, such that said cylindrical form does not only encompass a specific and invariable direction of flow but also geometries in which the direction of flow is diverted without however altering the dimensions of the circular geometry perpendicular to the direction of flow, such as in the case of bent and twisted or otherwise altered cylindrical forms. Thus, as regards the constant inner diameter of the preferred tubular reactor, said diameter may range anywhere from 2 to 1200 mm, wherein preferably the constant inner diameter is in the range of from 3 to 800 mm, more preferably from 4 to 500 mm, more preferably from 4.5 to 200 mm, more preferably from 5 to 100 mm, more preferably from 5.5 to 70 mm, more preferably from 6 to 50 mm, more preferably from 6.5 to 30 mm, more preferably from 7 to 20 mm, and more preferably from 7.5 to 15 mm. According to the inventive process it is however particularly preferred that at least a portion of the tubular reactor is of a regular cylindrical form having a constant inner diameter perpendicular to the direction of flow in the range of from 8 to 12 mm.

Same applies accordingly relative to the length of the continuous flow reactor which is not particularly limited and thus may range anywhere from 0.2 to 5,000 m, provided that depending on the cross section of the continuous flow reactor its volume is comprised in the range of from 150 cm$^3$ to 75 m$^3$. According to the inventive process it is however preferred that the length of the continuous flow reactor is in the range of from 0.5 to 3,000 m, wherein more preferably the continuous flow reactor has a length in the range of from 1 to 1,000 m more preferably from 3 to 700 m more preferably from 6 to 500 m, more preferably from 9 to 300 m, more preferably from 11 to 100 m, more preferably from 13 to 70 m, more preferably from 15 to 50 m, more preferably from 17 to 30 m, and more preferably from 18 to 25 m. According to the inventive process it is particularly preferred that the length of the continuous flow reactor is in the range of from 19 to 21 m.

As regards the material of which the wall of the continuous flow reactor is made, no particular restrictions apply provided that said material allows for a heating of the mixture in the continuous flow reactor to a temperature in the range of from 100 to 300° C. Thus, it is generally preferred that the wall of the continuous flow reactor is made of a metallic material, and in particular of a metallic material displaying a suitable thermal conductivity. Furthermore, it is preferred that the wall of the continuous flow reactor is mechanically stable, in particular in view of particular and preferred embodiments of the inventive process wherein the mixture crystallized in the continuous flow reactor is subject to elevated pressures. Finally, it is preferred that the wall of the continuous flow reactor is resistant to corrosion in view of the chemically reactive reagents which may be contained in the mixture prepared in (i) and continuously fed to the continuous flow reactor in (ii), in particular considering the elevated temperatures to which the mixture is heated during crystallization of the zeolitic material in (iii). Thus, it is particularly preferred according to the inventive process that the metallic material comprises one or more metals displaying one or more of the aforementioned advantageous properties. As such, it is particularly preferred according to the inventive process that the metallic material comprises one or more metals selected from the group consisting of Ta, Cr, Fe, Ni, Cu, Al, Mo, and combinations and/or alloys of two or more thereof, wherein more preferably the wall of the continuous flow reactor is made of a metallic material comprising one or more metals selected from the group consisting of Ta, Cr, Fe, Ni, Mo, and combinations and/or alloys of two or more thereof, and more preferably from the group consisting of Cr, Fe, Ni, Mo, and combinations and/or alloys of two or more thereof. According to the inventive process it is particularly preferred that the wall of the continuous flow reactor is made of a metallic material which comprises a nickel alloy, a nickel-molybdenum alloy, and more preferably a nickel-molybdenum-chromium alloy.

According to the inventive process it is further preferred that the surface of the inner wall of the continuous flow reactor is treated and/or aligned with one or more compounds and/or materials for inhibiting crystal growth at the interface between the reaction mixture conducted through the continuous flow reactor and the inner wall thereof. In this respect, there is no particular restriction as to the compounds and/or materials which may be applied to the inner wall of the continuous flow reactor to this effect such that in principle any suitable material and/or compound may be applied to the inner wall for this purpose. Thus, the inner wall of the continuous flow reactor may be lined with a polymer and/or other smooth material to prevent crystal growth on the walls and/or a lubricant film may be applied on the inner wall of the continuous flow reactor for achieving said inhibition of crystal growth. It is, however, preferred according to the inventive process that the surface of the inner wall of the continuous flow reactor is lined with an organic polymer material. As regards the preferred organic polymer material which may be applied to the inner wall of the continuous flow reactor according to particular and preferred embodiments of the inventive process, no particular restrictions apply such that any suitable polymer or polymer mixture may be employed to this effect. It is, however, particularly preferred according to the inventive process that the organic polymer material with which the surface of the inner wall of the continuous flow reactor is lined comprises one or more polymers selected from the group consisting of fluorinated polyalkylenes and mixtures of two or more thereof, more preferably from the group consisting of (C2-C3)polyalkylenes and mixtures of two or more thereof, and more preferably from the group consisting of fluorinated polyethylenes and mixtures of two or more thereof. According to the inventive process it is particularly preferred that the surface of the inner wall of the continuous flow reactor is lined with an organic polymer material comprising poly(tetrafluoroethylene), wherein more preferably the inner wall of the continuous flow reactor is lined with poly(tetrafluoroethylene).

As regards preferred means according to the inventive process for inhibiting the crystallization of the zeolitic material on the walls of the continuous flow reactor, any suitable further means may be employed to this effect instead of or in addition to the provision of one or more compounds and/or materials on the inner walls and in particular instead of or in addition to the lining of the inner wall of the continuous flow reactor with an organic polymer material according to any of the particular and preferred embodiments of the inventive process. Thus, in addition to or instead of the aforementioned means, it is preferred that the walls of the continuous flow reactor are subject to motion and in particular to oscillation and preferably to vibrational motion during crystallization of the zeolitic material in (iii), such that it is particularly preferred that the walls of the continuous flow reactor are subject to vibration during crystallization in (iii). As regards the means for inducing vibration of the walls of the continuous flow reactor during crystallization in (iii), this may be achieved by any mechanical and/or other means, wherein the mechanical energy necessary for inducing said vibration may be provided by using ultrasound and/or mechanically induced vibrations.

Furthermore, the mixture crystallized in (iii) in the continuous flow reactor itself may be mechanically agitated, wherein preferably mechanical agitation is achieved by movable parts contained in the continuous flow reactor such as one or more stirring means. To this effect, it is preferred according to the inventive process that the movable parts are provided such as to continually or periodically, preferably to continually free the walls of the continuous flow reactor from zeolitic materials and/or solid residue attached thereto, wherein more preferably the movable parts comprise a scraper, more preferably a screw, and more preferably a rotating screw.

As noted in the foregoing, it is preferred according to the inventive process that the mixture conducted through the continuous flow reactor in (iii) for crystallizing the zeolitic material is subject to elevated pressure during heating thereof, wherein preferably the mixture is heated in (iii) under autogenous pressure to this effect. As regards the preferred pressure applied and/or generated in (iii) during the crystallization of the zeolitic material, again no particular restrictions apply such that any suitable pressure may be applied and/or generated to this effect provided that the zeolitic material may be crystallized in (iii). Thus, by way of example, the mixture prepared in (i) and continuously fed in (ii) into the continuous flow reactor may be heated in (iii) during crystallization of the zeolitic material at a pressure ranging anywhere from 0.1 to 9 MPa, wherein preferably heating of the mixture in (iii) is effected at a pressure, and preferably at an autogenous pressure, in the range of from in the range of from 0.5 to 7 MPa, more preferably from 0.8 to 5 MPa, more preferably from 1.2 to 4 MPa, more preferably from 1.6 to 3.5 MPa, more preferably from 1.8 to 3 MPa, more preferably from 2 to 2.7 MPa. According to the inventive process it is particularly preferred that in (iii) heating of the mixture is effected at a pressure in the range of from 2.2 to 2.5 MPa, wherein the pressure is preferably autogenous.

Concerning the reactor geometry, it is preferred that, despite the fact that no particular restriction would apply in its respect, the continuous flow reactor consists of a single stage, wherein within the meaning of the present invention a single stage is characterized by the fact that the continuous flow of the mixture prepared in (i) through the reactor is not hindered or diverted from the direction of flow dictated by the walls of the continuous flow reactor by any means and in particular by the presence of baffles of any sort placed on the reactor walls and/or within the reactor volume.

In principle, there is no particular restriction as to the possibility of adding and/or removing matter from the reaction mixture during its passage through the continuous flow reactor in (iii) after its feeding into the reactor and prior to its complete transition through the entire length of the reactor and in particular of the entire length through the continuous flow reactor wherein the mixture is heated to a temperature in the range of from 100 to 300° C. Thus, by way of example, a solution containing one or more sources of $X_2O_3$ according to any of the particular and preferred embodiments of the present invention and in particular one or more sources of alumina may be added to the reaction mixture at one or several points during its passage through the continuous flow reactor in (iii) after its feeding into the reactor and prior to its complete transition through the entire length of the reactor. Nevertheless, it is preferred according to the inventive process that no matter is added to and/or removed from the reaction mixture during its passage through the continuous flow reactor in (iii), wherein preferably no matter is added. According to the inventive process it is particularly preferred that no matter is added to and no matter is removed from the reaction mixture during its passage through the continuous flow reactor in (iii). Alternatively, it is preferred that no supernatant liquor and in particular that no supernatant liquor as obtained from the inventive process is added to the reaction mixture during its passage through the continuous flow reactor in (iii).

According to the inventive process, the mixture prepared in (i) is continuously fed in (ii) into the continuous flow reactor for crystallization of the zeolitic material in (iii). As regards the mixture prepared in (i) no restrictions apply relative to one or more further steps which may be performed with the mixture prepared in (i) prior to the continuous feeding thereof into the continuous flow reactor in (ii). Thus, it is preferred according to the inventive process that prior to the continuous feeding of the mixture in the continuous flow reactor in (ii), said mixture is entirely or in part subject to a pre-treatment step and in particular to a step of aging. Thus, it is particularly preferred according to the inventive process that prior to (ii) the mixture prepared in (i) is aged by heating thereof for a determined period. As regards temperature at which the mixture is aged according to said particular and preferred embodiments of the inventive process, no particular restrictions apply such that aging may be performed by heating of the mixture prepared in (i) to a temperature anywhere in the range of from 40 to 120° C., wherein preferably the mixture prepared in (i) is aged prior to (ii) at a temperature in the range of from 50 to 110°

C., more preferably from 60 to 105° C., more preferably from 70 to 100° C., more preferably from 75 to 95° C. According to the inventive process it is particularly preferred that prior to (ii) the mixture prepared in (i) is aged at a temperature in the range of from 80 to 90° C.

Independently thereof, there is no particular restriction as to the duration of the preferred aging according to the aforementioned particular and preferred embodiments of the inventive process. Thus, the mixture prepared in (i) may be aged for any suitable duration prior to feeding of the mixture into the continuous flow reactor in (ii) such that, by way of example, the mixture prepared in (i) may be aged for a duration ranging anywhere from 1 to 72 h. According to the inventive process it is however preferred that prior to (ii) the mixture prepared in (i) is aged for a duration ranging from 6 to 72 h, more preferably from 12 to 66 h, more preferably from 24 to 66 h, more preferably from 36 to 60 h, and more preferably from 42 to 54 h. It is, however, particularly preferred according to the inventive process that prior to (ii) the mixture prepared in (i) is aged for a duration ranging from 46 to 50 h.

According to the inventive process it is, however, alternatively preferred that the mixture prepared in (i) is directly fed into the continuous flow reactor in (ii) and that in particular the mixture prepared in (i) is not subject to any type of treatment and in particular not subject to a heating regimen of any sort prior to the crystallizing of the zeolitic material in (iii). Thus, it is particularly preferred according to the inventive process that during preparation of the mixture in (i) and prior to its feeding into the continuous flow reactor in (ii) said mixture is not heated, and in particular not heated to a temperature of 40° C. or greater, and more preferably of 35° C. or greater. According to the inventive process it is however particularly preferred that in (i) and prior to (ii) the mixture prepared in (i) is not heated to a temperature of 30° C. or greater, wherein more preferably the mixture prepared in (i) is not subject to a heating step prior to (ii).

In (ii) of the inventive process, the mixture prepared in (i) is continuously fed into a continuous flow reactor. Although according to particular and preferred embodiments of the inventive process the mixture prepared in (i) is not subject to any type of treatment and in particular to any type of heating during its preparation and prior to (ii), it is preferred according to the inventive process that in (ii) the mixture prepared in (i) is pre-heated while being continuously fed into the continuous flow reactor. As regards the temperature to which the mixture prepared in (i) is preheated in (ii) no particular restrictions apply, wherein preferably the mixture is pre-heated to a temperature in the range of from 100 to 300° C. According to the inventive process it is further preferred that the mixture prepared in (i) is pre-heated while being fed to the continuous flow reactor in (ii) to a temperature in the range of from more preferably of from 100 to 280° C., more preferably of from 140 to 260° C., more preferably of from 160 to 250° C., more preferably of from 180 to 240° C., more preferably of from 190 to 230° C., and more preferably of from 200 to 220° C. It is, however, particularly preferred according to the inventive process that the mixture prepared in (i) is directly fed to the continuous flow reactor in (ii), wherein the mixture prepared in (i) is pre-heated while being fed to the continuous flow reactor in (ii) to a temperature according to any of the aforementioned particular and preferred embodiments of the inventive process, wherein more preferably the mixture is pre-heated while being fed to the continuous flow reactor to the temperature of the reactor according to any of the aforementioned particular and preferred embodiments of the inventive process.

According to the inventive process, there is no limitation whatsoever as to the further steps which may be included after crystallization of the zeolitic material in (iii). It is, however, preferred according to the inventive process that subsequent to crystallization in (iii) the process further comprises one or more of (iv) quenching the reaction product effluent continuously exiting the reactor in (iii) with a liquid comprising one or more solvents and/or via expansion of the reaction product effluent; and/or, preferably and, (v) isolating the zeolitic material obtained in (iii) or (iv); and/or, preferably and, (vi) washing the zeolitic material obtained in (iii), (iv) or (v); and/or, preferably and, (vii) drying the zeolitic material obtained in (iii), (iv), (v), or (vi); and/or, preferably and, (viii) calcining the zeolitic material obtained in (iii), (iv), (v), (vi), or (vii).

As regards the preferred quenching of the reaction product effluent in (iv) said quenching may be performed after the desired level of crystallization of the zeolitic material has been reached in (iii), which coincides with the reaction mixture having passed through the entire volume of the continuous flow reactor. Concerning the means with which the quenching of the reaction product effluent may be achieved, no particular restrictions apply such that any suitable means may be applied, provided that the reaction is effectively terminated. According to the inventive process it is however preferred that quenching of the reaction product effluent continuously exiting the reactor in (iii) is performed with a liquid comprising one or more solvents. Alternatively or in addition thereto, quenching of the reaction product effluent continuously exiting the reactor in (iii) is performed via expansion of the reaction product effluent. According to particular and preferred embodiments of the inventive process wherein quenching is effected by a combination of quenching with a liquid and expansion of the reaction product effluent, it is preferred that said steps are successively performed, wherein preferably the reaction product effluent continuously exiting the reactor in (iii) is first quenched with a liquid comprising one or more solvents and the resulting mixture subsequently expanded. Within the meaning of the present invention, the term "expanded" generally indicates a simultaneous drop in pressure and temperature of the reaction product effluent.

Concerning the liquid which may be employed for the preferred quenching of the reaction product effluent in (iv), no particular restrictions apply provided that the liquid is suited for terminating the reaction when sufficient amounts thereof is brought into contact with the reaction product effluent continuously exiting the reactor in (iii). Thus, by way of example, the liquid employed in (iv) for quenching of the reaction product effluent may comprise one or more solvents selected from the group consisting of polar protic solvents and mixtures thereof, wherein preferably the liquid comprises one or more solvents selected from the group consisting of n-butanol, isopropanol, propanol, ethanol, methanol, water, and mixtures thereof, and more preferably from the group consisting of ethanol, methanol, water, and mixtures thereof. According to the inventive process it is however particularly preferred that the liquid employed in (iv) for quenching of the reaction product effluent comprises water, wherein more preferably water is used as the liquid in (iv), preferably deionized water. Same applies accordingly relative to the amount in which the liquid may be employed in (iv) for quenching the reaction product effluent continuously exiting the reactor in (iii). Thus, by way of example, the weight ratio of the liquid comprising one or more solvents to the reaction product effluent continuously exiting the reactor may range anywhere from 0.5 to 30, wherein preferably in (iv) the weight ratio of the liquid comprising one or more solvents to the reaction product effluent is in the range of from 1 to 25, more preferably from 2 to 20, more preferably from 3 to 18, more preferably from 4 to 15, more preferably from 5 to 12, more preferably from 6 to 10, more preferably from 6.5 to 9, more preferably from 7 to 8.5. According to the inventive process it is particularly preferred that the process further comprises quenching of the reaction product effluent in (iv), wherein the weight ratio of the liquid comprising one or more solvents to the reaction product effluent is in the range of from 7.5 to 8.

According to the inventive process, it is preferred that the zeolitic material obtained in (iii) or (iv) is isolated in (v). As regards the means for isolation of the zeolitic material, no particular restrictions apply such that any suitable means may be employed to this effect. Thus, by way of example, the zeolitic material may be isolated from the reaction product effluent preferably after quenching thereof according to (iv) by means of filtration, ultrafiltration, diafiltration, centrifugation and/or decantation methods, wherein filtration methods can involve suction and/or pressure filtration steps. According to the inventive process it is however particularly preferred that in (v) the zeolitic material obtained in (iii) or (iv) is isolated by one or more steps of filtration.

As regards the supernatant obtained from the preferred isolation of the zeolitic material in (v), it is preferred that said supernatant is recycled to the initial step of preparing the mixture in (i) of the inventive process. Independently thereof, however, it is preferred that the supernatant obtained from the isolation of the zeolitic material in (v), and/or a feed having the same composition as said supernatant, is not at any point recycled to the reaction mixture during its passage through the continuous flow reactor, i.e. after feeding of the mixture prepared in (i) in (ii) and prior to the exiting of the reaction product effluent from the reactor which according to particular and preferred embodiments of the inventive process may be accompanied by a quenching procedure in (iv).

According to the inventive process it is alternatively preferred that in (v) isolating the zeolitic material includes a step of spray-drying the zeolitic material obtained in (iii) or (iv). Independently thereof, and preferably alternatively thereto, it is further preferred that in (vii) drying of the zeolitic material includes a step of spray-drying the zeolitic material obtained in any one of (iii), (iv), (v), or (vi). As regards the temperature at which the aforementioned preferred spray-drying procedures may be performed, again no particular restrictions apply such that any suitable temperature may be chosen to this effect. Thus, by way of example, preferred spray-drying in (v) and/or (vii) may be conducted at a temperature ranging anywhere from 150° C. to 800° C., wherein preferably spray-drying in (v) and/or (vii) is conducted at a temperature in the range of from 200 to 600° C., more preferably from 250 to 500° C., more preferably from 300 to 450° C., and more preferably from 350 to 400° C. According to the present invention, the temperature at which spray-drying is performed according to any of the particular and preferred embodiments thereof designates the temperature of entrance of the drying gas employed and/or to the temperature to which the zeolitic material is heated in the spray-drying zone, and preferably designates the temperature of entrance of the drying gas into the spray-drying zone.

Furthermore, it is preferred according to the inventive process that the zeolitic material obtained in (iii), (iv) or (v) is subject to washing in (vi). With respect to the one or more preferred washing procedures in (vi), any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

In addition to or alternatively to the aforementioned preferred work up steps, it is preferred that the zeolitic material obtained in any one of (iii), (iv), (v), or (vi) is dried in (vii). As regards the temperature at which drying in (vii) is achieved, no particular restrictions apply such that in principle drying may be effected at any suitable temperature including low temperatures such as in the case of freeze-drying. According to the inventive process it is however preferred that drying is effected at ambient temperature and preferably at a temperature elevated with respect to ambient temperature. Thus, by way of example, drying in (vii) may be effected at a temperature ranging anywhere from 50 to 220° C., wherein preferably drying in (vii) is effected at a temperature in the range of from 70 to 180° C., more preferably from 80 to 150° C., more preferably from 90 to 130° C., more preferably from 100 to 125° C., and more preferably from 110 to 120° C.

Finally, it is preferred according to the inventive process that the zeolitic material obtained in any one of (iii), (iv), (v), (vi), or (vii) is subject to calcination in (viii). Again, according to the inventive process no particular restrictions apply as to the temperature at which the zeolitic material may be calcined in (viii). Thus, by way of example, calcination may be effected at a temperature ranging anywhere from 300 to 750° C., wherein preferably calcination of the zeolitic material in (viii) is conducted at a temperature in the range of from 325 to 650° C., more preferably from 350 to 600° C., more preferably from 375 to 550° C., more preferably from 400 to 500° C., and more preferably from 425 to 475° C.

As regards the mixture prepared in (i) no particular restrictions apply neither with respect to the number and/or types of elements or compounds which may be employed to this effect, nor with respect to the respective amounts thereof, provided that the mixture comprises at least one source of $YO_2$ and a liquid solvent system. Furthermore, no restrictions apply as to the state in which the compounds provided for preparation of the mixture in (i) are provided and are contained in the mixture obtained in (i) and which is fed into the continuous flow reactor in (ii), wherein it is preferred that the mixture prepared in (i) and constituting the feed crystallized in (iii) consists of a single liquid phase optionally containing a solid phase, and more preferably that the mixture prepared in (i) and constituting the feed crystallized in (iii) consists of a single liquid phase containing a solid phase.

Thus, according to the inventive process, it is particularly preferred that the mixture prepared in (i) and crystallized in (iii) further comprises seed crystals, wherein said seed crystals preferably comprise a zeolitic material of the same type of framework structure as obtained from crystallization (iii), wherein more preferably the seed crystals comprise a zeolitic material as obtained or obtainable according to the inventive process, and preferably as obtained according to the inventive process. According to the inventive process it is thus particularly preferred that the seed crystals comprise one or more zeolitic materials having a framework structure selected from the group consisting of AEI, AFX, ANA, BEA, BEC, CAN, CHA, CDO, EMT, ERI, EUO, FAU, FER, GME, HEU, ITH, ITW, KFI, LEV, MEI, MEL, MFI, MOR, MTN, MWW, OFF, RRO, RTH, SAV, SFW, SZR, and TON, including mixed structures of two or more thereof, preferably from the group consisting of CAN, AEI, EMT, SAV, SZR, KFI, ERI, OFF, RTH, GME, AFX, SFW, BEA, CHA, FAU, FER, HEU, LEV, MEI, MEL, MFI, MOR, and MWW, including mixed structures of two or more thereof, more preferably from the group consisting of BEA, CHA, FAU, FER, GME, LEV, MFI, MOR, and MWW, including mixed structures of two or more thereof, more preferably from the group consisting of BEA, CHA, GME, MFI, MOR, and MWW, including mixed structures of two or more thereof, and more preferably from the group consisting of BEA, CHA, MFI, and MWW, including mixed structures of two or more thereof, wherein more preferably the seed crystals comprise one or more zeolites having the CHA and/or BEA framework structure, preferably the CHA framework structure. Particularly preferred according to the present invention are seed crystals comprising one or more zeolites selected from the group consisting of (Ni(deta)$_2$)-UT-6, Chabazite, |Li-Na|[Al—Si—O]-CHA, DAF-5, Dehyd. Na-Chabazite, K-Chabazite, LZ-218, Linde D, Linde R, Phi, SSZ-62, UiO-21, Willhendersonite, ZK-14, ZYT-6, and mixtures of two or more thereof, wherein more preferably the seed crystals comprise one or more zeolites selected from the group consisting of(Ni(deta)$_2$)-UT-6, Chabazite, |Li-Na|[Al—Si—O]-CHA, DAF-5, Dehyd. Na-Chabazite, K-Chabazite (Iran), LZ-218, Linde D, Linde R, Phi, SSZ-62, UiO-21, Willhendersonite, ZK-14, ZYT-6, and mixtures of two or more thereof, and wherein even more preferably the seed crystals comprise Chabazite. According to an even more preferred embodiments Chabazite is employed as seed crystals in the inventive process, wherein preferably said Chabazite seed crystals are either obtainable according to the inventive process or have been actually obtained according to said process.

According to the inventive process, any suitable amount of seed crystals can be provided in the mixture prepared in (i), provided that a zeolitic material is crystallized in (iii). In general, the amount of seed crystals contained in the mixture according to (i) ranges from 0.5 to 25 wt.-% based on 100 wt.-% of YO$_2$ contained in the mixture, preferably from 1 to 20 wt.-%, more preferably from 2 to 17 wt.-%, more preferably from 4 to 15 wt.-%, more preferably from 6 to 13 wt.-%, and more preferably from 8 to 12 wt.-%. According to particularly preferred embodiments of the inventive process, from 9 to 11 wt.-% of seed crystals according to any of the particular and preferred embodiments of the present invention are employed, based on 100 wt.-% of YO$_2$ in the at least one source for YO$_2$ provided in (i) of the inventive process.

Furthermore, it is preferred according to the inventive process that the mixture prepared in (i) and crystallized in (iii) further comprises one or more organotemplates. Again, according to the inventive process, no particular restrictions apply neither with respect to the number and types of organotemplates which may be employed, nor with regard to the amounts in which these may be used. It is, however, preferred according to the inventive process that the one or more organotemplates are selected from the group consisting of tetraalkylammonium compounds, 1N-alkyl-3-quinuclidinol, or N,N,N-trialkyl-exo-aminonorbornane, and mixtures of two or more thereof, wherein more preferably the one or more organotemplates are selected from the group consisting of 1-adamantyltri(C1-C3)alkylammonium compounds, N,N,N-tri($C_1$-$C_2$)alkyl-($C_5$-$C_6$)cycloalkylammonium compounds, N,N,N-trimethyl-N-benzylammonium compounds, and mixtures of two or more thereof, more preferably from the group consisting of 1-adamantyltric(C1-C2)alkylammonium compounds, N,N,N-tri($C_1$-$C_2$)alkyl-cyclopentylammonium compounds, N,N,N-tri($C_1$-$C_2$)alkyl-cyclohexylammonium compounds, and mixtures of two or more thereof, and more preferably from the group consisting of 1-adamantyltriethylammonium compounds, 1-adamantyldiethyl-methylalkylammonium compounds, 1-adamantylethyl-dimethyl-ammonium compounds, 1-adamantyltrimethylammonium compounds, N,N,N-triethyl-cyclohexylammonium compounds, N,N-diethyl-N-methyl-cyclohexylammonium compounds, N,N-dimethyl-N-ethyl-cyclohexylammonium compounds, N,N,N-trimethyl-cyclohexylammonium compounds, and mixtures of two or more thereof. According to the inventive process it is, however, particularly preferred that the one or more organotemplates preferably further comprised in the mixture prepared in (i) and crystallized in (iii) further comprises one or more 1-adamantyltrimethylammonium compounds and/or one or more N,N,N-trimethyl-cyclohexylammonium compounds, wherein more preferably the one or more organotemplates comprises one or more 1-adamantyltrimethylammonium compounds.

According to the inventive process it is alternatively preferred that the one or more organotemplates are selected from the group consisting of tetra($C_1$-$C_3$)alkylammonium compounds, dibenzylmethylammonium compounds, dibenzyl-1,4-diazabicyclo[2,2,2]octane, and mixtures of two or more thereof, preferably from the group consisting of tetra ($C_1$-$C_2$)alkylammonium compounds, dibenzylmethylammonium compounds, dibenzyl-1,4-diazabicyclo[2,2,2]octane, and mixture of two or more thereof, more preferably from the group consisting of tetraethylammonium compounds, triethylmethylammonium compounds, diethyldimethylammonium compounds, ethyltrimethylammonium compounds, tetramethylammonium compounds, and combinations of two or more thereof. According to the inventive process it is, however, particularly preferred that the one or more organotemplates alternatively preferably further comprised in the mixture prepared in (i) and crystallized in (iii) further comprises one or more tetraethylammonium compounds.

As regards the preferred tetraalkylammonium compounds included as organotemplates in the mixture prepared in (i), it is preferred that independently of one another the tetraalkylammonium compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium compounds are tetraalkylammonium hydroxides and/or chlorides, and even more preferably tetraalkylammonium hydroxides.

It is, however, alternatively preferred according to the inventive process that the mixture prepared in (i) and fed into the continuous flow reactor in (ii) for crystallization in (iii) does not comprise an organotemplate, wherein in particular no organotemplate is contained in the continuous flow reactor at any point of the crystallization process conducted therein. Furthermore and independently thereof, it is preferred according to the inventive process that the mixture prepared in (i) contains substantially no phosphorous and/or phosphorous containing compounds. Same applies accordingly relative to the zeolitic material obtained in (iii) such that it is preferred according to the inventive process that said zeolitic material contains substantially no phosphorous, wherein preferably the zeolitic material obtained in (iii) contains substantially no phosphorous and/or phosphorous containing compounds.

Within the meaning of the present invention, reference to the mixture prepared in (i) not containing an organotemplate and/or phosphorus and/or phosphorus containing compounds indicates that said respective elements or compounds are not contained in the mixture prepared in (i) in an amount greater than 0.1 wt.-% based on the total weight of the mixture prepared in (i) and preferably not in an amount greater than 0.05 wt.-%, more preferably greater than 0.001 wt.-%, more preferably greater than 0.0005 wt.-%, and even more preferably greater than 0.0001 wt.-% based on the total weight of the mixture prepared in (i).

As regards $YO_2$ and/or precursors thereof employed as a source of $YO_2$ for preparing the mixture in (i) of the inventive process, there is no particular restriction as to the one or more elements for which Y stands, provided that said element is a tetravalent element and that it is comprised in the zeolitic material crystallized in (iii). In particular, within the meaning of the present invention, $YO_2$ is at least partially and preferably entirely comprised in the framework structure of the zeolitic material as structure building element, as opposed to non-framework elements which can be present in the pores and cavities formed by the framework structure and typical for zeolitic materials in general. Thus, taking into account the aforementioned, Y may stand for any conceivable tetravalent element, Y standing either for a single or several tetravalent elements. Preferred tetravalent elements according to the present invention include Si, Sn, Ti, Zr, Ge, as well as combinations of any two or more thereof. According to preferred embodiments of the present invention, Y stands for Si and/or Sn, wherein according to particularly preferred embodiments of the present invention, Y comprises Si and even more preferably Y is Si.

In preferred embodiments of the present invention, wherein Y stands for Si or for a combination of Si with one or more further tetravalent elements, the source for $SiO_2$ preferably provided in (i) can also be any conceivable source. Thus, by way of example, any type of silicas and/or silicates and/or silica derivatives may be used, preferably silicas, silicates, and mixtures thereof, wherein more preferably the one or more sources for $YO_2$ comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof. According to the inventive process it is particularly preferred that the one or more sources for $YO_2$ used in (i) are selected from the group consisting of fumed silica, silica hydrosols, silica gel, silicic acid, water glass, colloidal silica, pyrogenic silica, silicic acid esters, tetraalkoxysilanes, and mixtures of two or more thereof, more preferably from the group consisting of silica hydrosols, silicic acid, water glass, colloidal silica, silicic acid esters, tetraalkoxysilanes, and mixtures of two or more thereof, more preferably from the group consisting of water glass, colloidal silica, silicic acid esters, tetraalkoxysilanes, and mixtures of two or more thereof. According to said particularly preferred embodiments, it is further preferred that the one or more sources for $YO_2$ are selected from the group consisting of water glass, colloidal silica, and mixtures thereof, wherein even more preferably the at least one source of $YO_2$ is selected from the group consisting of water glass, colloidal silica, and mixtures thereof, wherein more preferably colloidal silica is employed as the source of $YO_2$.

According to the present invention the mixture prepared in (i) optionally further comprises one or more sources for $X_2O_3$, wherein X is a trivalent element. As regards the elements which may be employed as the trivalent element X comprised in the one or more sources for $X_2O_3$ provided in (i), there is no particular restriction according to the present invention as to which elements or element mixtures may be employed, provided that a zeolitic material is crystallized in (iii) comprising $YO_2$ and $X_2O_3$ as framework elements. According to preferred embodiments of the present invention, X is selected from the group consisting of Al, B, In, Ga, and mixtures of two or more thereof, wherein preferably X is Al and/or B. According to particularly preferred embodiments of the present invention, X comprises Al, wherein even more preferably X is Al.

According to embodiments of the present invention wherein the mixture prepared in (i) comprises one or more sources for $X_2O_3$, it is preferred in instances wherein one or more sources of $Al_2O_3$ is contained in the mixture that said one or more sources comprises one or more aluminum salts, preferably an aluminate of an alkali metal and/or aluminum hydroxide, and preferably aluminum hydroxide, wherein more preferably the at least one source for $X_2O_3$ is an aluminate of an alkali metal and/or aluminum hydroxide, preferably aluminum hydroxide, wherein the alkali metal is preferably selected from the group consisting of Li, Na, K, Rb, and Cs, wherein more preferably the alkali metal is Na and/or K, and wherein even more preferably the alkali metal is Na.

Although there is no particular restriction according to the inventive process relative to the pH of the mixture prepared in (i) fed into the continuous flow reactor in (ii) for crystallization in (iii), it is nevertheless preferred that the mixture displays a basic pH, such that it is preferred according to the inventive process that the mixture prepared in (i) further comprises at least one source for $OH^-$, wherein said at least one source for $OH^-$ preferably comprises a metal hydroxide, more preferably a hydroxide of an alkali metal M, more preferably sodium and/or potassium hydroxide, and more preferably sodium hydroxide.

As regards embodiments of the present invention wherein one or more sources for $X_2O_3$ are provided in (i), no particular restriction applies according to the present invention neither regarding the type of the one or more sources for $X_2O_3$, nor with respect to amounts in which they are used. Thus, by way of example, relative to the amount of the one or more sources for $YO_2$ provided in the mixture prepared in (i), the $YO_2:X_2O_3$ molar ratio of the mixture may range anywhere from 1 to 1,000, wherein preferably the molar ratio is in the range of from 2 to 500, more preferably from 4 to 200, more preferably from 8 to 150, more preferably from 12 to 100, more preferably from 16 to 50, and more preferably from 20 to 30. According to particularly preferred embodiments, the $YO_2:X_2O_3$ molar ratio of the mixture prepared in (i) is in the range of from 24 to 26.

Concerning the liquid solvent system provided in (i) for preparation of the mixture, no particular restrictions apply such that in principle any suitable liquid solvent system may be employed to this effect, provided that the zeolitic material may be crystallized in (iii). Thus, by way of example, the liquid solvent system may comprise one or more solvents selected from the group consisting of polar protic solvents and mixtures thereof, wherein preferably the one or more solvents are selected from the group consisting of n-butanol, isopropanol, propanol, ethanol, methanol, water, and mixtures thereof, and more preferably from the group consisting of ethanol, methanol, water, and mixtures thereof. According to the inventive process it is particularly preferred that the solvent system comprises water, wherein more preferably water is used as the liquid solvent system, preferably deionized water.

With respect to particular and preferred embodiments of the inventive process wherein the liquid solvent system provided in (i) for preparing the mixture comprises water and in particular wherein water is used as the liquid solvent system, no particular restrictions apply as to the amounts in which water may be employed for preparation of the mixture in (i). Thus, by way of example, the mixture prepared in (i) may display a $H_2O:YO_2$ molar ratio ranging anywhere from 10 to 800, wherein preferably the $H_2O:YO_2$ molar ratio ranges from 30 to 600, more preferably from 50 to 400, more preferably from 70 to 300, more preferably from 90 to 250, more preferably from 110 to 220, more preferably from 130 to 190, and more preferably from 150 to 170. According to the inventive process it is particularly preferred that the $H_2O:YO_2$ molar ratio of the mixture prepared in (i) ranges from 155 to 165.

In addition to the aforementioned or alternatively thereto, the mixture prepared in (i) may comprise one or more alkali metals M, wherein preferably the one or more alkali metals M are selected from the group consisting of Li, Na, K, Cs, and mixtures thereof. According to the inventive process it is particularly preferred that the mixture prepared in (i) further comprises Na and/or K, and more preferably Na as the alkali metal M.

According to particular and preferred embodiments of the inventive process wherein the mixture prepared in (i) comprises one or more alkali metals M, there is no particular restriction as to the amounts in which said one or more alkali metals M may be contained therein. Thus, by way of example, the $M:YO_2$ molar ratio in the mixture prepared in (i) may range anywhere from 0.005 to 5, wherein preferably the $M:YO_2$ molar ratio in the mixture prepared in (i) is in the range of from 0.01 to 2, more preferably from 0.02 to 1, more preferably from 0.04 to 0.5, more preferably from 0.06 to 0.2, and more preferably from 0.08 to 0.16. According to the inventive process it is particularly preferred that the $M:YO_2$ molar ratio in the mixture prepared in (i) is in the range of from 0.1 to 0.14.

The inventive process is not by any means limited relative to the number or type of zeolitic materials which may be obtained. Thus, in principle, any conceivable zeolitic material may be obtained by the inventive continuous process having any of the known framework structure types as defined by the International Zeolite Association (IZA). Thus, by way of example, the zeolitic material crystallized in (iii) may have a framework structure selected from the group consisting of AEI, AFX, ANA, BEA, BEC, CAN, CHA, CDO, EMT, ERI, EUO, FAU, FER, GME, HEU, ITH, ITW, KFI, LEV, MEI, MEL, MFI, MOR, MTN, MWW, OFF, RRO, RTH, SAV, SFW, SZR, and TON, including mixed structures of two or more thereof, wherein preferably the zeolitic material crystallized in (iii) has a framework structure selected from the group consisting of CAN, AEI, EMT, SAV, SZR, KFI, ERI, OFF, RTH, GME, AFX, SFW, BEA, CHA, FAU, FER, HEU, LEV, MEI, MEL, MFI, MOR, and MWW, including mixed structures of two or more thereof, more preferably from the group consisting of BEA, CHA, FAU, FER, GME, LEV, MFI, MOR, and MWW, including mixed structures of two or more thereof, more preferably from the group consisting of BEA, CHA, GME, MFI, MOR, and MWW, including mixed structures of two or more thereof, and more preferably from the group consisting of BEA, CHA, MFI, and MWW, including mixed structures of two or more thereof. According to the inventive process it is particularly preferred that zeolitic material crystallized in (iii) has the CHA and/or BEA framework structure, preferably the CHA framework structure.

According to the inventive process, it is further preferred that the zeolitic material obtained in (v), (vi), (vii), or (viii) is subject to an ion-exchange procedure in (ix), wherein at least one ionic non-framework element or compound contained in the zeolitic material is ion-exchanged against one or more metal ions. In general, any conceivable ion-exchange procedure can be conducted on the zeolitic material to this effect, provided that a metal ion-exchanged zeolitic material is obtained. It is, however, preferred according to the present invention that the zeolitic material obtained in (v), (vi), (vii), or (viii) is first converted to the H-form, preferably via the ammonium form and subsequent calcination thereof for obtaining the H-form, prior to ion change with copper and/or iron.

Therefore, it is preferred according to the inventive process that in (ix) the step of subjecting the zeolitic material to an ion-exchange procedure includes the steps of
(ix.a) subjecting the zeolitic material obtained in (v), (vi), (vii), or (viii) to an ion-exchange procedure, wherein at least one ionic non-framework element or compound contained in the zeolitic material is ion-exchanged against $NH_4^+$;
(ix.b) calcining the ion-exchanged zeolitic material obtained in (ix.a) for obtaining the H-form of the zeolitic material;
(ix.c) subjecting the zeolitic material obtained in (ix.b) to an ion-exchange procedure, wherein $H^+$ contained in the zeolitic material as ionic non-framework element is ion-exchanged against one or more metal ions.

With respect to the one or more metal ions which may be employed for ion exchange in (ix), no particular restrictions apply such that any suitable one or more metal ions may be employed to this effect, provided that at least one ionic non-framework element or compound contained in the zeolitic material is ion-exchanged against one or more metal ions. Thus, by way of example, the one or more metal ions selected from the group consisting of ions of alkaline earth metal elements and/or transition metal elements, wherein preferably the one or more metal ions employed in (ix) is selected from the group consisting of ions of metals selected from group 4 and groups 6-11 of the Periodic Table of the Elements, preferably from group 4 and groups 8-11, wherein more preferably the one or more metal ions are selected from the group consisting of ions of Mg, Ti, Cu, Co, Cr, Ni, Fe, Mo, Mn, Ru, Rh, Pd, Ag, Os, Ir, Pt, Au, and mixtures of two or more thereof, and more preferably from the group consisting of ions of Ti, Cu, Fe, Rh, Pd, Pt, and mixtures of two or more thereof. According to the inventive process it is, however, particularly preferred that in (ix) the at least one ionic non-framework element or compound contained in the zeolitic material is ion-exchanged against Cu and/or Fe, preferably against Cu.

As regards the amount of the one or more metal ions which is preferably ion exchanged into the zeolitic material according to the inventive process in (ix), no particular restrictions apply such that in principle, any conceivable amount of copper and/or iron may be exchanged therein. Thus, by way of example, the zeolitic material may be ion exchanged in (ix) such as to obtain a metal loading in the zeolitic material ranging from 0.1 to 15 wt.-% calculated as the element and based on 100 wt.-% of $YO_2$ contained in the zeolitic material. It is, however, preferred according to the inventive process that the zeolitic material is ion exchanged such as to obtain a loading of metal ion ranging from 0.5 to 10 wt.-%, and more preferably from 1 to 8 wt.-%, more preferably from 1.5 to 7 wt.-%, more preferably from 2 to 6 wt.-%, more preferably from 2.5 to 5.5 wt.-%, more preferably from 3 to 5 wt.-%, and more preferably from 3.5 to 4.5 wt.-%. According to the inventive process it is particularly preferred that the zeolitic material is ion exchanged in (ix) such as to obtain a metal ion loading ranging from 3.8 to 4.2 wt.-% calculated as the element and based on 100 wt.-% of $YO_2$ contained in the zeolitic material.

Concerning the state and in particular the valence in which the metal is ion exchanged into the zeolitic material, it is noted that no particular restrictions apply according to the present invention. Regarding the particularly preferred embodiments of the inventive process wherein copper and/or iron is ion exchanged into the zeolitic material, copper and iron may be ion exchanged as $Cu^+$, $Cu^{2+}$, $Fe^{2+}$, and/or $Fe^{3+}$, respectively, wherein it is however preferred according to the present invention that independently from one another copper is ion exchanged as $Cu^{2+}$ and iron is ion exchanged as $Fe^{2+}$.

In addition to relating to a continuous process for the production of a zeolitic material, the present invention furthermore relates to a zeolitic material which is either obtained by the process according to the present invention or by any conceivable process which leads to a catalyst as obtainable according to the inventive process. Therefore, the present invention also relates to a zeolitic material per se as obtainable and/or obtained according to the process as defined in any of the particular and preferred embodiments of the inventive process in the present application.

Notwithstanding the fact that the zeolitic material according to the present invention may be used in any conceivable application, the present invention further relates to the use of the inventive catalyst as a molecular sieve, as an adsorbent, for ion-exchange, as a catalyst and/or as a catalyst support, wherein preferably the inventive zeolitic material is used as a catalyst and/or as a catalyst support. With respect to the use of the zeolitic material as a catalyst, no particular limitations apply as to the reactions which may be catalyzed by the zeolitic material. It is, however, particularly preferred according to the present invention that the inventive catalyst according to any of the particular and preferred embodiments defined in the present application is used as a catalyst for the selective catalytic reduction of NOx, and preferably in the treatment of NOx containing exhaust gas by selective catalytic reduction, wherein more preferably the catalyst is used in the treatment of industrial or automotive exhaust gas. According to the present invention it is particularly preferred that the inventive catalyst according to any of the particular and preferred embodiments defined in the present application is used in the treatment of automotive exhaust gas.

The present invention is further characterized by the following and particular preferred embodiments, including the combination and embodiments indicated by the respective dependencies:

1. A continuous process for preparing a zeolitic material comprising
   (i) preparing a mixture comprising a source of $YO_2$, optionally a source of $X_2O_3$, and a liquid solvent system;
   (ii) continuously feeding the mixture prepared in (i) into a continuous flow reactor at a liquid hourly space velocity in the range of from 0.3 to 20 $h^{-1}$ for a duration of at least 1 h; and
   (iii) crystallizing the zeolitic material from the mixture in the continuous flow reactor, wherein the mixture is heated to a temperature in the range of from 100 to 300° C.; wherein the volume of the continuous flow reactor is in the range of from 150 $cm^3$ to 75 $m^3$.

2. The process of embodiment 1, wherein the liquid hourly space velocity is in the range of from 0.5 to 16 $h^{-1}$, more preferably from 1 to 14 $h^{-1}$, more preferably from 2 to 12 $h^{-1}$, more preferably from 3 to 10 $h^{-1}$, more preferably from 3.5 to 8 $h^{-1}$, more preferably from 4 to 6 $h^{-1}$, and more preferably from 4.5 to 5.5 $h^{-1}$.

3. The process of embodiment 1 or 2, wherein in (ii) the mixture prepared in (i) is continuously fed into the continuous flow reactor for a duration ranging from 3 h to 360 d, more preferably from 6 h to 120 d, more preferably from 12 h to 90 d, more preferably from 18 h to 60 d, more preferably from 1 to 30 d, more preferably from 1.5 to 25 d, more preferably from 2 to 20 d, more preferably from 2.5 to 15 d, more preferably from 3 to 12 d, more preferably from 3.5 to 8 d, and more preferably from 4 to 6 d.

4. The process of any of embodiments 1 to 3, wherein in (iii) the mixture is heated to a temperature in the range of from 100 to 280° C., preferably of from 140 to 260° C., more preferably of from 160 to 250° C., more preferably of from 180 to 240° C., more preferably of from 190 to 230° C., and more preferably of from 200 to 220° C.

5. The process of any of embodiments 1 to 4, wherein the volume of the continuous flow reactor is in the range of from 155 $cm^3$ to 30 $m^3$, preferably from 160 $cm^3$ to 10 $m^3$, more preferably from 165 $cm^3$ to 7 $m^3$, more preferably from 170 $cm^3$ to 3 $m^3$, more preferably from 175 $cm^3$ to 1 $m^3$, more preferably from 180 to 700,000 $cm^3$, more preferably from 185 to 500,000 $cm^3$, more preferably from 190 to 300,000 $cm^3$, more preferably from 195 to 100,000 $cm^3$, more preferably from 200 to 70,000 $cm^3$, more preferably from 205 to 50,000 $cm^3$, more preferably from 210 to 30,000 $cm^3$, more preferably from 215 to 10,000 $cm^3$, more preferably from 220 to 7,000 $cm^3$, more preferably from 225 to 5,000 $cm^3$, more preferably from 230 to 3,000 $cm^3$, more preferably from 235 to 1,000 $cm^3$, more preferably from 240 to 700 $cm^3$, more preferably from 245 to 500 $cm^3$, and more preferably from 250 to 300 $cm^3$.

6. The process of any of embodiments 1 to 5, wherein the continuous flow reactor is selected among a tubular reactor, a ring reactor, and a continuously oscillating reactor, preferably among a plain tubular reactor, a tubular membrane reactor, a tubular reactor with Coanda effect, a ring reactor, and a continuously oscillating baffled reactor, wherein more preferably the continuous flow reactor is a plain tubular reactor and/or a ring reactor, wherein more preferably the continuous flow reactor is a plain tubular reactor.

7. The process of any of embodiments 1 to 6, wherein at least a portion of the tubular reactor is of a regular cylindrical form having a constant inner diameter perpendicular to the direction of flow, wherein the inner diameter is preferably in the range of from 2 to 1200 mm, more preferably from 3 to 800 mm, more preferably from 4 to 500 mm, more preferably from 4.5 to 200 mm, more preferably from 5 to 100 mm, more preferably from 5.5 to 70 mm, more preferably from 6 to 50 mm, more preferably from 6.5 to 30 mm, more preferably from 7 to 20 mm, more preferably from 7.5 to 15 mm, and more preferably from 8 to 12 mm.

8. The process of any of embodiments 1 to 7, wherein the continuous flow reactor has a length in the range of from 0.2 to 5,000 m, preferably from 0.5 to 3,000 m, more preferably from 1 to 1,000 m more preferably from 3 to 700 m more preferably from 6 to 500 m, more preferably from 9 to 300 m, more preferably from 11 to 100 m, more preferably from 13 to 70 m, more preferably from 15 to 50 m, more preferably from 17 to 30 m, more preferably from 18 to 25 m, and more preferably from 19 to 21 m.

9. The process of any of embodiments 1 to 8, wherein the wall of the continuous flow reactor is made of a metallic material, wherein the metallic material comprises one or more metals selected from the group consisting of Ta, Cr, Fe, Ni, Cu, Al, Mo, and combinations and/or alloys of two or more thereof, preferably from the group consisting of Ta, Cr, Fe, Ni, Mo, and combinations and/or alloys of two or more thereof, preferably from the group consisting of Cr, Fe, Ni, Mo, and combinations and/or alloys of two or more thereof wherein preferably the metallic material comprises a nickel alloy, a nickel-molybdenum alloy, and more preferably a nickel-molybdenum-chromium alloy.

10. The process of any of embodiments 1 to 9, wherein the surface of the inner wall of the continuous flow reactor is lined with an organic polymer material, wherein the organic polymer material preferably comprises one or more polymers selected from the group consisting of fluorinated polyalkylenes and mixtures of two or more thereof, preferably from the group consisting of (C2-C3)polyalkylenes and mixtures of two or more thereof, preferably from the group consisting of fluorinated polyethylenes and mixtures of two or more thereof, wherein more preferably the polymer material comprises poly(tetrafluoroethylene), wherein more preferably the inner wall of the continuous flow reactor is lined with poly(tetrafluoroethylene).

11. The process of any of embodiments 1 to 10, wherein the continuous flow reactor is straight and/or comprises one or more curves with respect to the direction of flow, wherein preferably the continuous flow reactor is straight and/or has a coiled form with respect to the direction of flow.

12. The process of any of embodiments 1 to 11, wherein the walls of the continuous flow reactor are subject to vibration during crystallization in (iii).

13. The process of any of embodiments 1 to 12, wherein in (iii) the mixture is heated under autogenous pressure, wherein preferably the pressure is in the range of from 0.1 to 9 MPa, more preferably in the range of from 0.5 to 7 MPa, more preferably from 0.8 to 5 MPa, more preferably from 1.2 to 4 MPa, more preferably from 1.6 to 3.5 MPa, more preferably from 1.8 to 3 MPa, more preferably from 2 to 2.7 MPa, and more preferably from 2.2 to 2.5 MPa.

14. The process of any of embodiments 1 to 13, wherein the continuous flow reactor consists of a single stage.

15. The process of any of embodiments 1 to 14, wherein no matter is added to and/or removed from the reaction mixture during its passage through the continuous flow reactor in (iii), wherein preferably no matter is added, wherein more preferably no matter is added and no matter is removed from the reaction mixture during its passage through the continuous flow reactor in (iii).

16. The process of any of embodiments 1 to 15, wherein prior to (ii) the mixture prepared in (i) is aged at a temperature in the range of from 40 to 120° C., preferably from 50 to 110° C., more preferably from 60 to 105° C., more preferably from 70 to 100° C., more preferably from 75 to 95° C., and more preferably from 80 to 90° C.

17. The process of any of embodiments 1 to 16, wherein prior to (ii) the mixture prepared in (i) is aged for a duration ranging from 1 to 72 h, more preferably from 6 to 72 h, more preferably from 12 to 66 h, more preferably from 24 to 66 h, more preferably from 36 to 60 h, more preferably from 42 to 54 h, and more preferably from 46 to 50 h.

18. The process of any of embodiments 1 to 17, wherein in (i) and prior to (ii) the mixture prepared in (i) is not heated to a temperature of 40° C. or greater, preferably of 35° C. or greater, more preferably of 30° C. or greater, wherein more preferably in (i) and prior to (ii) the mixture prepared in (i) is not subject to a heating step.

19. The process of any of embodiments 1 to 18, wherein the mixture prepared in (i) is directly fed to the continuous flow reactor in (ii), wherein while being fed to the continuous flow reactor in (ii), the mixture prepared in (i) is pre-heated, preferably to a temperature in the range of from 100 to 300° C., more preferably of from 100 to 280° C., more preferably of from 140 to 260° C., more preferably of from 160 to 250° C., more preferably of from 180 to 240° C., more preferably of from 190 to 230° C., and more preferably of from 200 to 220° C.

20. The process of any of embodiments 1 to 19, wherein the process further comprises
(iv) quenching the reaction product effluent continuously exiting the reactor in (iii) with a liquid comprising one or more solvents and/or via expansion of the reaction product effluent;
and/or, preferably and,
(v) isolating the zeolitic material obtained in (iii) or (iv);
and/or, preferably and,
(vi) washing the zeolitic material obtained in (iii), (iv) or (v);
and/or, preferably and,
(vii) drying the zeolitic material obtained in (iii), (iv), (v), or (vi);
and/or, preferably and,
(viii) calcining the zeolitic material obtained in (iii), (iv), (v), (vi), or (vii).

21. The process of embodiment 20, wherein in (iv) the liquid comprises one or more solvents selected from the group consisting of polar protic solvents and mixtures thereof,
preferably from the group consisting of n-butanol, isopropanol, propanol, ethanol, methanol, water, and mixtures thereof,
more preferably from the group consisting of ethanol, methanol, water, and mixtures thereof,
wherein more preferably the liquid comprises water, and wherein more preferably water is used as the liquid, preferably deionized water.

22. The process of embodiment 20 or 21, wherein in (iv) the weight ratio of the liquid comprising one or more solvents to the reaction product effluent continuously exiting the reactor in the range of from 0.5 to 30, preferably from 1 to 25, more preferably from 2 to 20, more preferably from 3 to 18, more preferably from 4 to 15, more preferably from 5 to 12, more preferably from 6 to 10, more preferably from 6.5 to 9, more preferably from 7 to 8.5, and more preferably from 7.5 to 8.

23. The process of any of embodiments 20 to 22, wherein drying in (vii) is effected at a temperature in the range from 50 to 220° C., preferably from 70 to 180° C., more preferably from 80 to 150° C., more preferably from 90 to 130° C., more preferably from 100 to 125° C., and more preferably from 110 to 120° C.

24. The process of any of embodiments 20 to 23, wherein the calcining in (viii) is effected at a temperature in the range from 300 to 750° C., more preferably from 325 to 650° C., more preferably from 350 to 600° C., more preferably from 375 to 550° C., more preferably from 400 to 500° C., and more preferably from 425 to 475° C.

25. The process of any of embodiments 20 to 24, wherein the supernatant obtained from the isolation of the zeolitic material in (v), and/or a feed having the same composition as said supernatant, is not at any point recycled to the reaction mixture during its passage through the continuous flow reactor.

26. The process of any of embodiments 20 to 25, wherein in (v) isolating the zeolitic material includes a step of spray-drying the zeolitic material obtained in (iii) or (iv), and/or
wherein in (vii) drying of the zeolitic material includes a step of spray-drying the zeolitic material obtained in (iii), (iv), (v), or (vi).

27. The process of any of embodiments 1 to 26, wherein the mixture prepared in (i) and crystallized in (iii) further comprises seed crystals.

28. The process of any of embodiments 1 to 27, wherein the mixture prepared in (i) and crystallized in (iii) further comprises one or more organotemplates.

29. The process of embodiment 28, wherein the one or more organotemplates are selected from the group consisting of tetraalkylammonium compounds, 1N-alkyl-3-quinuclidinol, or N,N,N-trialkyl-exo-aminonorbornane, and mixtures of two or more thereof, preferably from the group consisting of 1-adamantyltri(C1-C3)alkylammonium compounds, N,N,N-tri($C_1$-$C_2$)alkyl-($C_5$-$C_6$)cycloalkylammonium compounds, N,N,N-trimethyl-N-benzylammonium compounds, and mixtures of two or more thereof, more preferably from the group consisting of 1-adamantyltri(C1-C2)alkylammonium compounds, N,N,N-tri($C_1$-$C_2$)alkyl-cyclopentylammonium compounds, N,N,N-tri($C_1$-$C_2$)alkyl-cyclohexylammonium compounds, and mixtures of two or more thereof, more preferably from the group consisting of 1-adamantyltriethylammonium compounds, 1-adamantyldiethyl-methylalkylammonium compounds, 1-adamantylethyl-dimethyl-ammonium compounds, 1-adamantyltrimethylammonium compounds, N,N,N-triethyl-cyclohexylammonium compounds, N,N-diethyl-N-methyl-cyclohexylammonium compounds, N,N-dimethyl-N-ethyl-cyclohexylammonium compounds, N,N,N-trimethyl-cyclohexylammonium compounds, and mixtures of two or more thereof, wherein more preferably the one or more organotemplates comprises one or more 1-adamantyltrimethylammonium compounds and/or one or more N,N,N-trimethyl-cyclohexylammonium compounds, wherein more preferably the one or more organotemplates comprises one or more 1-adamantyltrimethylammonium compounds.

30. The process of embodiment 28, wherein the one or more organotemplates are selected from the group consisting of tetra(C1-C3)alkylammonium compounds, dibenzylmethylammonium compounds, dibenzyl-1,4-diazabicyclo[2,2,2]octane, and mixture of two or more thereof, preferably from the group consisting of tetra(C1-C2)alkylammonium compounds, dibenzylmethylammonium compounds, dibenzyl-1,4-diazabicyclo[2,2,2]octane, and mixture of two or more thereof, more preferably from the group consisting of tetraethylammonium compounds, triethylmethylammonium compounds, diethyldimethylammonium compounds, ethyltrimethylammonium compounds, tetramethylammonium compounds, and combinations of two or more thereof, wherein more preferably the one or more organotemplates comprises one or more tetraethylammonium compounds.

31. The process of embodiment 29 or 30, wherein independently of one another the tetraalkylammonium compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium compounds are tetraalkylammonium hydroxides and/or chlorides, and even more preferably tetraalkylammonium hydroxides.

32. The process of any of embodiments 1 to 31, wherein the mixture prepared in (i) and crystallized in (iii) does not comprise one or more organotemplates.

33. The process of any of embodiments 1 to 32, wherein the mixture prepared in (i) and constituting the feed crystallized in (iii) consists of a single liquid phase optionally containing a solid phase.

34. The process of any of embodiments 1 to 33, wherein the mixture crystallized in (iii) in the continuous flow reactor is mechanically agitated, wherein preferably mechanical agitation is achieved by movable parts contained in the continuous flow reactor, wherein more preferably the movable parts are provided such as to continually or periodically, preferably to continually free the walls of the continuous flow reactor from zeolitic materials and/or solid residue attached thereto, wherein more preferably the movable parts comprise a scraper, more preferably a screw, and more preferably a rotating screw.

35. The process of any of embodiments 1 to 34, wherein Y is selected from the group consisting of Si, Sn, Ti, Zr, Ge, and combinations of two or more thereof, Y preferably being Si.

36. The process of any of embodiments 1 to 35, wherein the at least one source for $YO_2$ comprises one or more compounds selected from the group consisting of silicas, silicates, and mixtures thereof,
preferably from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof,
more preferably from the group consisting of fumed silica, silica hydrosols, silica gel, silicic acid, water glass, colloidal silica, pyrogenic silica, silicic acid esters, tetraalkoxysilanes, and mixtures of two or more thereof,
more preferably from the group consisting of silica hydrosols, silicic acid, water glass, colloidal silica, silicic acid esters, tetraalkoxysilanes, and mixtures of two or more thereof, more preferably from the group consisting of water glass, colloidal silica, silicic acid esters, tetraalkoxysilanes, and mixtures of two or more thereof
more preferably from the group consisting of water glass, colloidal silica, and mixtures thereof,
wherein more preferably the at least one source of $YO_2$ is selected from the group consisting of water glass, colloidal silica, and mixtures thereof, wherein more preferably colloidal silica is employed as the source of $YO_2$.

37. The process of any of embodiments 1 to 36, wherein X is selected from the group consisting of Al, B, In, Ga, and combinations of two or more thereof, X preferably being Al.

38. The process of any of embodiments 1 to 37, wherein the at least one source for $X_2O_3$ comprises one or more aluminum salts, preferably an aluminate of an alkali metal and/or aluminum hydroxide, preferably aluminum hydroxide, wherein more preferably the at least one source for $X_2O_3$ is an aluminate of an alkali metal and/or aluminum hydroxide, preferably aluminum hydroxide,
wherein the alkali metal is preferably selected from the group consisting of Li, Na, K, Rb, and Cs, wherein more preferably the alkali metal is Na and/or K, and wherein even more preferably the alkali metal is Na.

39. The process of any of embodiments 1 to 38, wherein the mixture prepared in (i) further comprises at least one source for $OH^-$, wherein said at least one source for $OH^-$ preferably comprises a metal hydroxide, more preferably a hydroxide of an alkali metal M, more preferably sodium and/or potassium hydroxide, and more preferably sodium hydroxide.

40. The process of any of embodiments 1 to 39, wherein the $YO_2:X_2O_3$ molar ratio of the mixture prepared in (i) ranges from 1 to 1,000, preferably from 2 to 500, more preferably from 4 to 200, more preferably from 8 to 150, more preferably from 12 to 100, more preferably from 16 to 50, more preferably from 20 to 30, and more preferably from 24 to 26.

41. The process of any of embodiments 1 to 40, wherein the mixture prepared in (i) further comprises seed crystals, wherein the amount of seed crystals in the mixture prepared in (i) preferably ranges from 0.5 to 25 wt.-% based on 100 wt.-% of $YO_2$ contained in the mixture, preferably from 1 to 20 wt.-%, more preferably from 2 to 17 wt.-%, more preferably from 4 to 15 wt.-%, more preferably from 6 to 13 wt.-%, more preferably from 8 to 12 wt.-%, and more preferably from 9 to 11 wt.-%.

42. The process of embodiment 41, wherein the seed crystals comprise one or more zeolites having a framework structure selected from the group consisting of AEI, AFX, ANA, BEA, BEC, CAN, CHA, CDO, EMT, ERI, EUO, FAU, FER, GME, HEU, ITH, ITW, KFI, LEV, MEI, MEL, MFI, MOR, MTN, MWW, OFF, RRO, RTH, SAV, SFW, SZR, and TON, including mixed structures of two or more thereof, preferably from the group consisting of CAN, AEI, EMT, SAV, SZR, KFI, ERI, OFF, RTH, GME, AFX, SFW, BEA, CHA, FAU, FER, HEU, LEV, MEI, MEL, MFI, MOR, and MWW, including mixed structures of two or more thereof, more preferably from the group consisting of BEA, CHA, FAU, FER, GME, LEV, MFI, MOR, and MWW, including mixed structures of two or more thereof, more preferably from the group consisting of BEA, CHA, GME, MFI, MOR, and MWW, including mixed structures of two or more thereof, and more preferably from the group consisting of BEA, CHA, MFI, and MWW, including mixed structures of two or more thereof, wherein more preferably the seed crystals comprise one or more zeolites having the CHA and/or BEA framework structure, preferably the CHA framework structure.

43. The process of any of embodiments 1 to 42, wherein the liquid solvent system comprises one or more solvents, wherein the liquid solvent system preferably comprises one or more solvents selected from the group consisting of polar protic solvents and mixtures thereof, preferably from the group consisting of n-butanol, isopropanol, propanol, ethanol, methanol, water, and mixtures thereof,
more preferably from the group consisting of ethanol, methanol, water, and mixtures thereof,
wherein more preferably the solvent system comprises water, and wherein more preferably water is used as the solvent system, preferably deionized water.

44. The process of embodiment 43, wherein the mixture prepared in (i) comprises water as the solvent system, wherein the $H_2O:YO_2$ molar ratio of the mixture prepared in (i) preferably ranges from 10 to 800, preferably from 30 to 600, more preferably from 50 to 400, more preferably from 70 to 300, more preferably from 90 to 250, more preferably from 110 to 220, more preferably from 130 to 190, more preferably from 150 to 170, and more preferably from 155 to 165.

45. The process of any of embodiments 1 to 44, wherein the mixture prepared in (i) comprises one or more alkali metals M, preferably one or more alkali metals M selected from the group consisting of Li, Na, K, Cs, and mixtures thereof, wherein more preferably the mixture prepared in (i) further comprises Na and/or K, more preferably Na as the alkali metal M.

46. The process of any of embodiments 1 to 45, wherein the $M:YO_2$ molar ratio in the mixture prepared in (i) ranges from 0.005 to 5, preferably from 0.01 to 2, more preferably from 0.02 to 1, more preferably from 0.04 to 0.5, more preferably from 0.06 to 0.2, more preferably from 0.08 to 0.16, and more preferably from 0.1 to 0.14.

47. The process of any of embodiments 1 to 46, wherein the zeolitic material crystallized in (iii) has a framework structure selected from the group consisting of AEI, AFX, ANA, BEA, BEC, CAN, CHA, CDO, EMT, ERI, EUO, FAU, FER, GME, HEU, ITH, ITW, KFI, LEV, MEI, MEL, MFI, MOR, MTN, MWW, OFF, RRO, RTH, SAV, SFW, SZR, and TON, including mixed structures of two or more thereof, preferably from the group consisting of CAN, AEI, EMT, SAV, SZR, KFI, ERI, OFF, RTH, GME, AFX, SFW, BEA, CHA, FAU, FER, HEU, LEV, MEI, MEL, MFI, MOR, and MWW, including mixed structures of two or more thereof, more preferably from the group consisting of BEA, CHA, FAU, FER, GME, LEV, MFI, MOR, and MWW, including mixed structures of two or more thereof, more preferably from the group consisting of BEA, CHA, GME, MFI, MOR, and MWW, including mixed structures of two or more thereof, and more preferably from the group consisting of BEA, CHA, MFI, and MWW, including mixed structures of two or more thereof, wherein more preferably the zeolitic material crystallized in (iii) has the CHA and/or BEA framework structure, preferably the CHA framework structure.

48. The process of any of embodiments 1 to 47, wherein the mixture prepared in (i) contains substantially no phosphorous and/or phosphorous containing compounds.

49. The process of any of embodiments 1 to 48, wherein the framework of the zeolitic material obtained in (iii) contains substantially no phosphorous, wherein preferably the zeolitic material obtained in (iii) contains substantially no phosphorous and/or phosphorous containing compounds.

50. The process of any of embodiments 20 to 49, wherein the process further comprises (ix) subjecting the zeolitic material obtained in (v), (vi), (vii), or (viii) to an ion-exchange procedure, wherein at least one ionic non-framework element or compound contained in the zeolitic material is ion-exchanged against one or more metal ions.

51. The process of embodiment 50, wherein in (ix) the step of subjecting the zeolitic material to an ion-exchange procedure includes the steps of
- (ix.a) subjecting the zeolitic material obtained in (v), (vi), (vii), or (viii) to an ion-exchange procedure, wherein at least one ionic non-framework element or compound contained in the zeolitic material is ion-exchanged against $NH_4^+$;
- (ix.b) calcining the ion-exchanged zeolitic material obtained in (ix.a) for obtaining the H-form of the zeolitic material;
- (ix.c) subjecting the zeolitic material obtained in (ix.b) to an ion-exchange procedure, wherein $H^+$ contained in the zeolitic material as ionic non-framework element is ion-exchanged against one or more metal ions.

52. The process of embodiment 51, wherein the one or more metal ions are selected from the group consisting of ions of alkaline earth metal elements and/or transition metal elements, more preferably from the group consisting of ions of metals selected from group 4 and groups 6-11 of the Periodic Table of the Elements, preferably from group 4 and groups 8-11, wherein more preferably the one or more metal ions are selected from the group consisting of ions of Mg, Ti, Cu, Co, Cr, Ni, Fe, Mo, Mn, Ru, Rh, Pd, Ag, Os, Ir, Pt, Au, and mixtures of two or more thereof, more preferably from the group consisting of ions of Ti, Cu, Fe, Rh, Pd, Pt, and mixtures of two or more thereof, wherein more preferably the at least one ionic non-framework element or compound contained in the zeolitic material is ion-exchanged against Cu and/or Fe, preferably against Cu.

53. The process of any of embodiments 50 to 52, wherein in (ix) the zeolitic material is ion-exchanged such as to obtain a loading of the one or more metal ions in the zeolitic material ranging from 0.1 to 15 wt.-% calculated as the element and based on 100 wt.-% of $YO_2$ contained in the zeolitic material, preferably from 0.5 to 10 wt.-%, more preferably from 1 to 8 wt.-%, more preferably from 1.5 to 7 wt.-%, more preferably from 2 to 6 wt.-%, more preferably from 2.5 to 5.5 wt.-%, more preferably from 3 to 5 wt.-%, more preferably from 3.5 to 4.5 wt.-%, and more preferably from 3.8 to 4.2 wt.-%.

54. A zeolitic material as obtainable and/or obtained according to the process of any of embodiments 1 to 53.

55. Use of a zeolitic material according to embodiment 54 as a molecular sieve, as an adsorbent, for ion-exchange, as a catalyst and/or as a catalyst support, preferably as a catalyst and/or as a catalyst support, more preferably as a catalyst for the selective catalytic reduction of $NO_x$, and more preferably in the treatment of $NO_N$ containing exhaust gas by selective catalytic reduction, wherein more preferably the zeolitic material is used in the treatment of industrial or automotive exhaust gas, preferably in the treatment of automotive exhaust gas.

EXPERIMENTAL SECTION

X-ray diffraction experiments on the powdered materials were performed using a Bragg-Brentano diffractometer with a Cu X-ray source and an energy dispersive point detector. The angular range of 2° to 70° (2 theta) was scanned with a step size of 0.02°, using a fixed divergence slit.

For determining the lattice parameters and crystallinity of the samples, the X-ray diffraction data was analysed using the TOPAS V4 software, wherein the sharp diffraction peaks were modeled using the Pawley model containing the pertinent unit cell parameters and space group. These were refined to fit the data. Independent broad peaks were inserted to describe the amorphous content. The crystalline content describes the intensity of the crystalline signal to the total scattered intensity. Included in the model are a linear background, Lorentz and polarization corrections, lattice parameters, space group and crystallite size. The crystallinity value K was calculated as the following ratio:

$$K = \frac{I_{crystalline}}{I_{crystalline} + I_{amorphous}}$$

wherein "crystalline" stands for the total scattered intensity form the sharp crystalline reflections, and "amorphous" stands for the total intensity of the broad reflections associated to the amorphous content.

Reference Example 1: Synthesis of chabazite seed crystals

A mixture containing sodium hydroxide (50 wt % solution), colloidal silica (Ludox LS, 30 wt % aqueous solution), non-crystalline aluminum hydroxide, trimethyl-adamantyl-ammoniumhydroxide (TMAdAOH), and demineralized water was prepared having a 20 $H_2O$:0.04 $Al_2O_3$:1 $SiO_2$: 0.12 $Na_2O$:0.2 TMAdAOH molar ratio. The synthesis gel was then filled in an autoclave and stirred for 5 days at 160° C. The resulting material was filtered off for separation from the mother liquor, washed with water and dried at 80° C. for obtaining a white powder.

Figure 1:
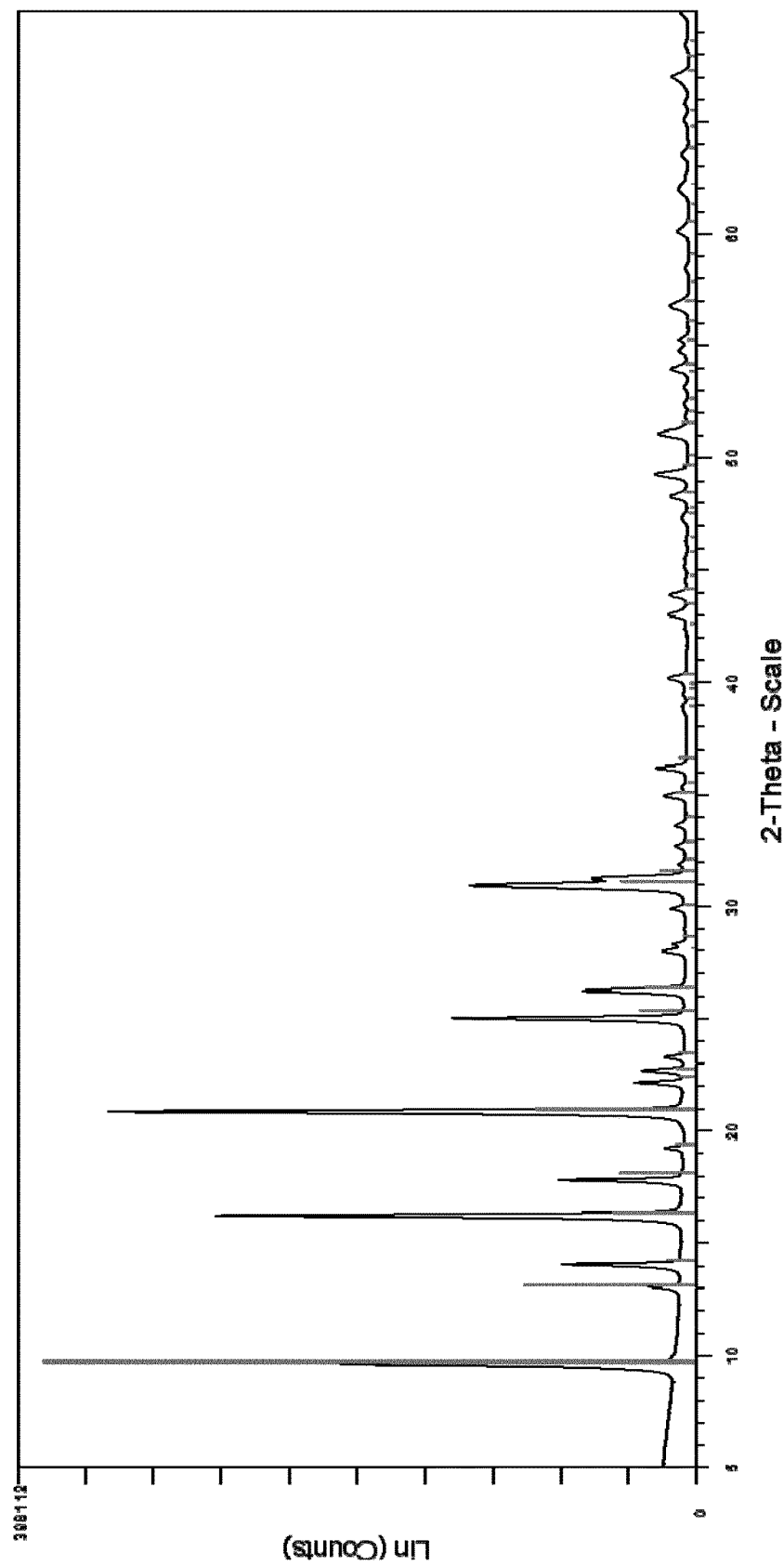
FIGS. 1, 3, and 5 respectively show the X-ray diffraction pattern (measured using Cu K alpha-1 radiation) of the crystalline materials obtained according to Reference Example 1, Comparative Example 1, and Example 1, respectively, wherein the line pattern of the CHA-type framework has been further included in the respective figures for comparison. In the figures, the angle 2 theta in ° is shown along the abscissa and the intensities are plotted along the ordinate.

The XRD-pattern of the product is displayed in FIG. 1 and reveals chabazite as the single crystalline phase.

Figure 2:
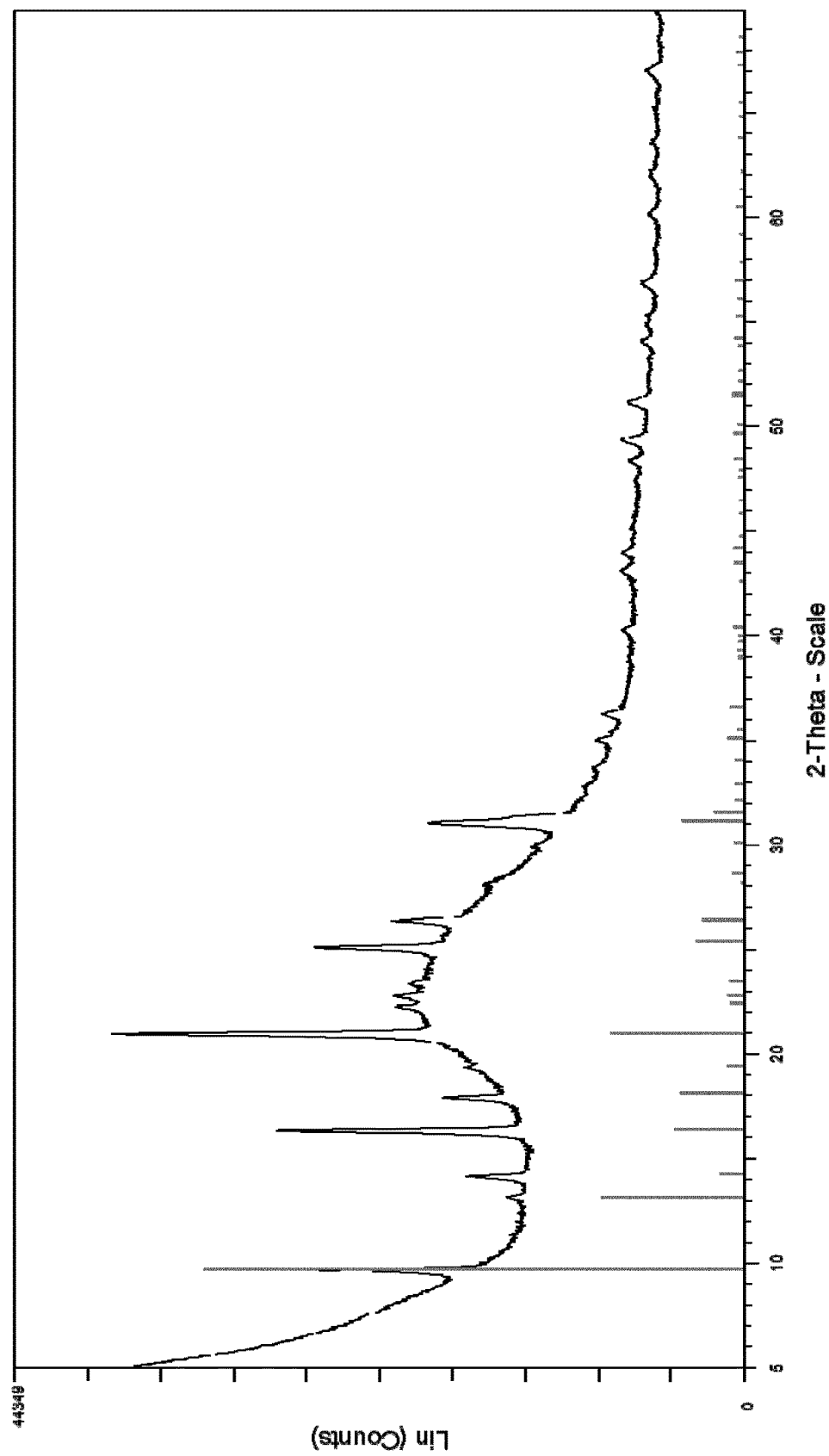
FIG. 2 shows the X-ray diffraction pattern (measured using Cu K alpha-1 radiation) of the intermediate aged seeded synthesis gel obtained according to Comparative Example 1, wherein the line pattern of the CHA-type framework has been further included in the figure for comparison. In the figure, the angle 2 theta in ° is shown along the abscissa and the intensities are plotted along the ordinate.

Comparative Example 1: Continuous synthesis of chabazite in a 12.5 cm$^3$ tubular flow reactor A mixture containing sodium hydroxide (50 wt % solution), colloidal silica (Ludox LS, 30 wt % aqueous solution), non-crystalline aluminum hydroxide, trimethyl-adamantyl-ammoniumhydroxide (TMAdAOH), and demineralized water was prepared having a 20 $H_2O$:0.04 $Al_2O_3$:1 $SiO_2$: 0.12 $Na_2O$:0.2 TMAdAOH molar ratio, wherein 10 wt.-% of chabazite from Reference Example 1 based on the amount of $SiO_2$ was added for obtaining a synthesis gel including the seeds, which was then aged at 85° C. for 48 hours. The XRD-pattern of the aged synthesis gel is displayed in FIG. 2 and shows, in addition to the reflections stemming from the chabazite seed crystals, amorphous parts coming from the silica and alumina sources.

The resulting material was used for continuous synthesis without further purification. In addition, the XRD patterns of chabazite is visible, which comes from the seeds added to the gel.

For the continuous synthesis, a tubular flow reactor of 1 meter in length and 4 mm inner diameter, having two inlets and one outlet was employed. The tube reactor was immersed in oil, which was heated to 210-230° C. To keep the water liquid and to prevent evaporation, the reactor was operated under autogenous pressure.

Prior to being continuously fed into the reactor, the aged synthesis gel was diluted with 100 vol.-% of water based on the volume of the synthesis gel and subsequently fed into the reactor by one to the inlets. In parallel, mother liquor as obtained from Reference Example 1 after separation of the chabazite product was fed into the second inlet at a vol.-% ratio of diluted synthesis gel: mother liquor=1:3, wherein the feeds meet prior to or at the entrance of the tubular reactor. The rate at which the respective feeds in diluted synthesis gel and mother liquor where fed into the reactor were adjusted such, that a flow rate of 1.3 ml/min was achieved, as a result of which the residence time in the reactor was around 12 min.

The reaction mixture exiting the reactor was continuously quenched with a feed of distilled water at a fate of 10 ml/min for interrupting the reaction and subsequently the pressure was allowed to drop to atmospheric pressure with the aid of a valve without, however, leading to a reduction of the pressure in the reactor. During the reaction, the temperature of the reaction mixture within the tubular flow reactor is adjusted to 210° C., and the autogenous pressure measured in the reactor was in the range of from 2.2-2.5 MPa.

Figure 3:
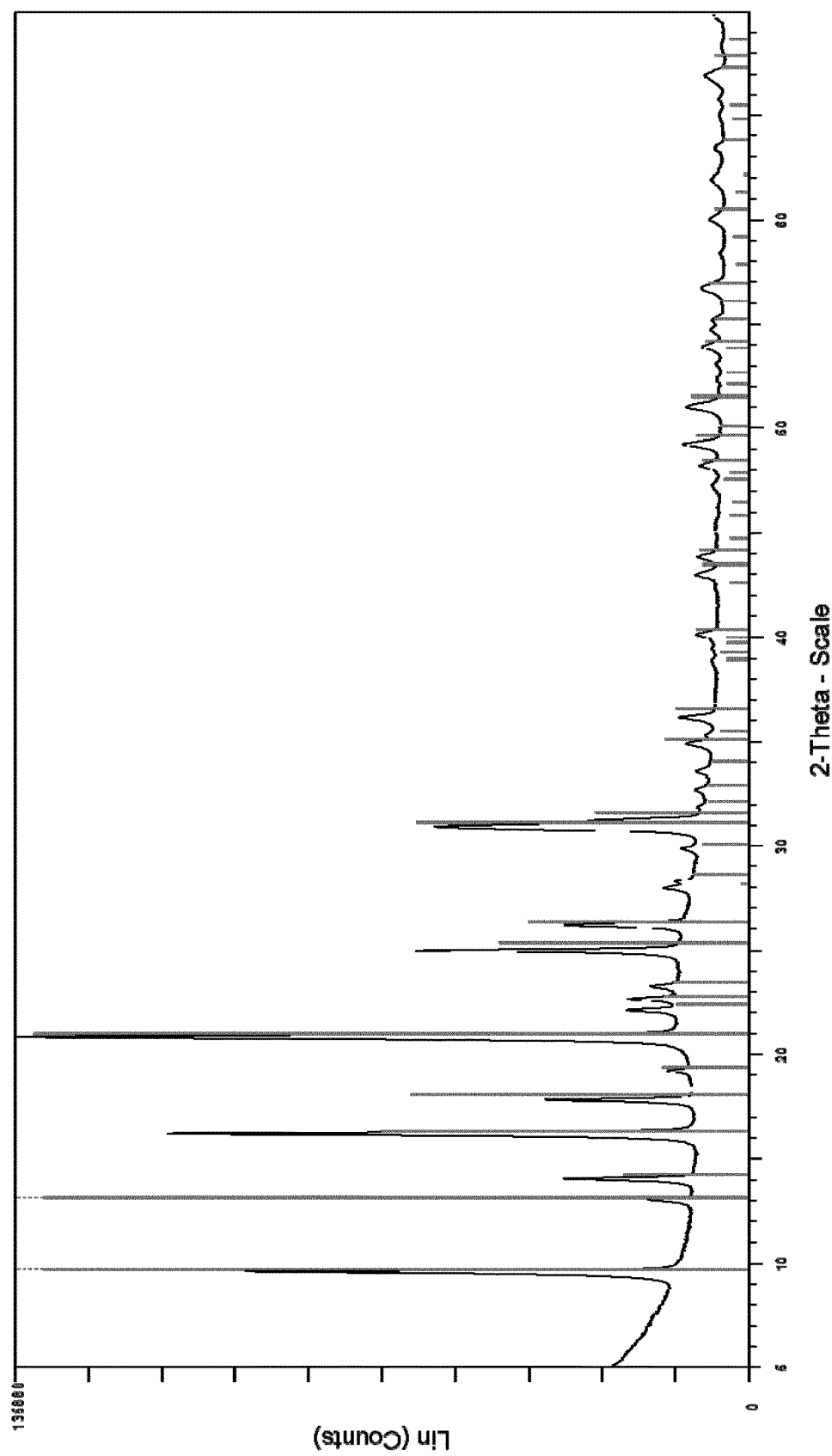

The crystalline product obtained from the tubular flow reactor was separated from the reaction mixture, washed with water, and dried to afford a white powder. The XRD-pattern of the product is displayed in FIG. 3 and reveals chabazite as the single crystalline phase, wherein the crystallinity of the product was measured to be 64%.

Figure 4:
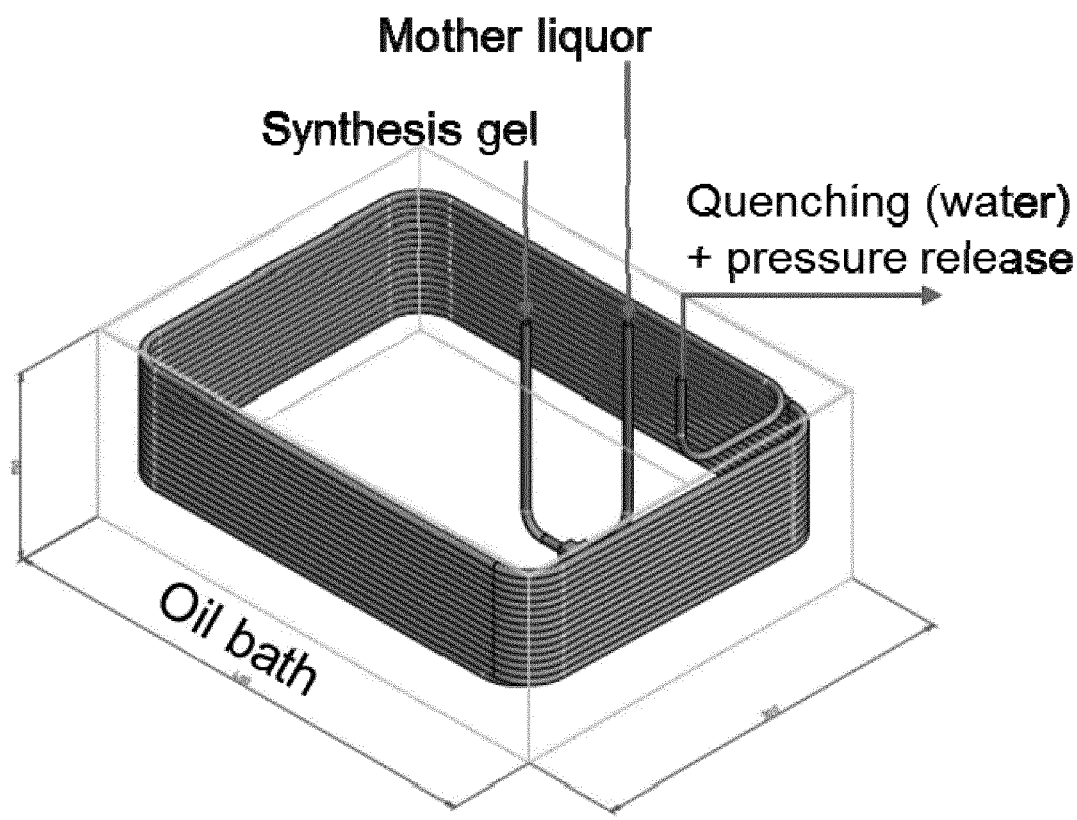
FIG. 4 displays the setup of the tubular flow reactor employed in Example 1.

Example 1: Continuous synthesis of chabazite in a 250 cm$^3$ tubular flow reactor The synthesis of Comparative Example 1 was repeated using a tubular flow reactor of 20 meters in length and 4 mm inner diameter, having two inlets and one outlet. The tube reactor was immersed in oil, which was heated to 210-230° C. To keep the water liquid and to prevent evaporation, the reactor was again operated under autogenous pressure. The reactor setup is depicted in FIG. 4 including the dimensions of the oil bath provided around the tubular reactor.

The seeded synthesis gel was prepared and aged, diluted and fed together with mother liquor as obtained from Reference Example 1 into the tubular reactor, wherein the feed rate was adjusted to 26 ml/min for achieving the same residence time of around 12 min for the reaction mixture as in Comparative Example 1.

The reaction mixture exiting the reactor was continuously quenched with a feed of distilled water at a fate of 10 ml/min for interrupting the reaction and the pressure was allowed to drop to atmospheric pressure with the aid of a valve without, however, leading to a reduction of the pressure in the reactor. During the reaction, the temperature of the reaction mixture within the tubular flow reactor is adjusted to 210° C., and the autogenous pressure measured in the reactor was in the range of from 2.2-2.5 MPa.

Figure 5:
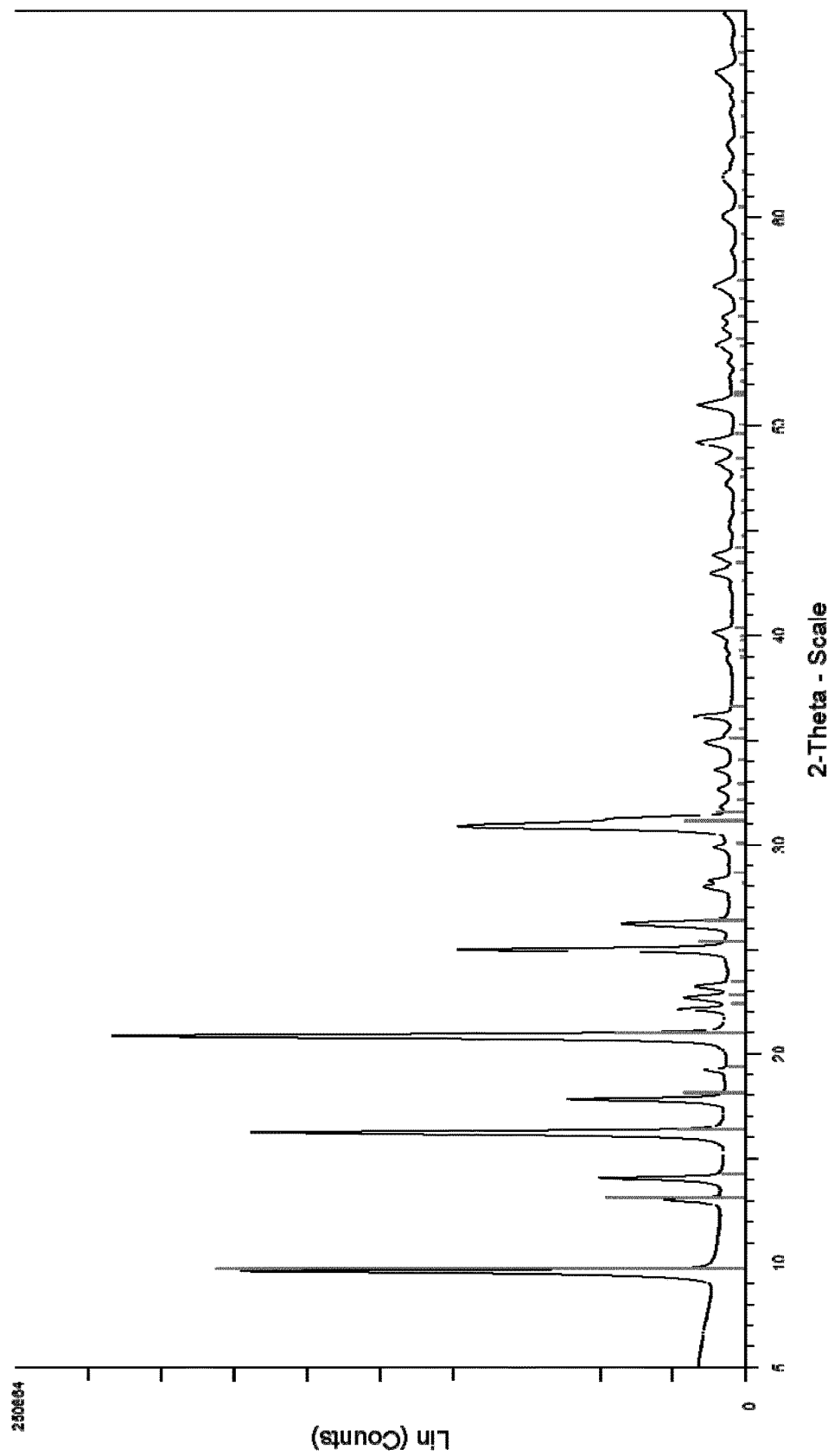

The crystalline product obtained from the tubular flow reactor was separated from the reaction mixture, washed with water, and dried to afford a white powder. The XRD-pattern of the product is displayed in FIG. 5 and reveals chabazite as the single crystalline phase, wherein the crystallinity of the product was measured to be 100%. No amorphous phase or other zeolite phases were detected.

Example 2: Selective catalytic reduction testing

For catalyst testing, the chabazite obtained from Example 1 was ion-exchange with copper and subsequently calcined, the final material showing a specific BET surface area of 563 m$^2$/g, and a Langmuir surface area of 740 m$^2$/g Langmuir. The elemental analysis of the calcined and copper loaded sample gave: Al 4.1 wt %, Cu 3.1 wt %, Na 0.05 wt %, and Si 36 wt %. The Cu content obtained upon ion-exchange is thus slightly higher compared to batch wise prepared chabzite samples.

The copper-exchange chabazite sample was tested in SCR catalysis and its performance compared to a copper-exchanged sample obtained from a batch synthetic procedure based on Comparative Example 1 ("CE 1") of US 2011/0076229 A1. To this effect, the samples were contacted at various temperatures with a gas stream containing nitrogen oxide. The samples were tested in the fresh state, as well as after separate aging regimens in air containing 10 wt.-% water at 750° C. for 5 h, and subsequently at 850° C. for 6 h, respectively.

More specifically, the samples to be tested were mixed with a slurry of premilled alumina (approx. 30 wt % solid content) in a weight ratio zeolite: Al2O3=70:30. After drying and calcination (1 h, 550° C. in air), the resulting cake was crushed and sieved to a particle size of 250-500 μm which was used for testing. For aging, a fraction of the shaped powders was placed as shallow bed in a high temperature resistant ceramic crucible. In a muffle oven the temperature was ramped up under a flow of air and 10% steam. After reaching the desired value of 750° C. or 850° C. the temperature was kept constant for 5 h, or 6 h respectively, then the heating was switched off.

Catalytic performance tests on fresh and aged powders were performed in a screening reactor system. 170 mg of shaped powder (fresh or aged) was diluted with corundum of the same particle size to represent 1 mL of a coated catalyst with a typical washcoat loading and placed in the reactor. The samples were exposed to a feed gas mixture containing 500 ppm NO, 500 ppm $NH_3$, 10% $O_2$, 5% $H_2O$, and balance $N_2$ at a gas hourly space velocity of (GHSV) of 70,000 h$^{-1}$. The samples were tested under stationary conditions at different discrete temperature levels (T=200, 300, 450, and 575° C.). After a sufficient equilibration time, the signal of the online gas analyzers (ABB LIMAS) was averaged for 30s and the resulting value used to calculate conversions.

Figure 6:
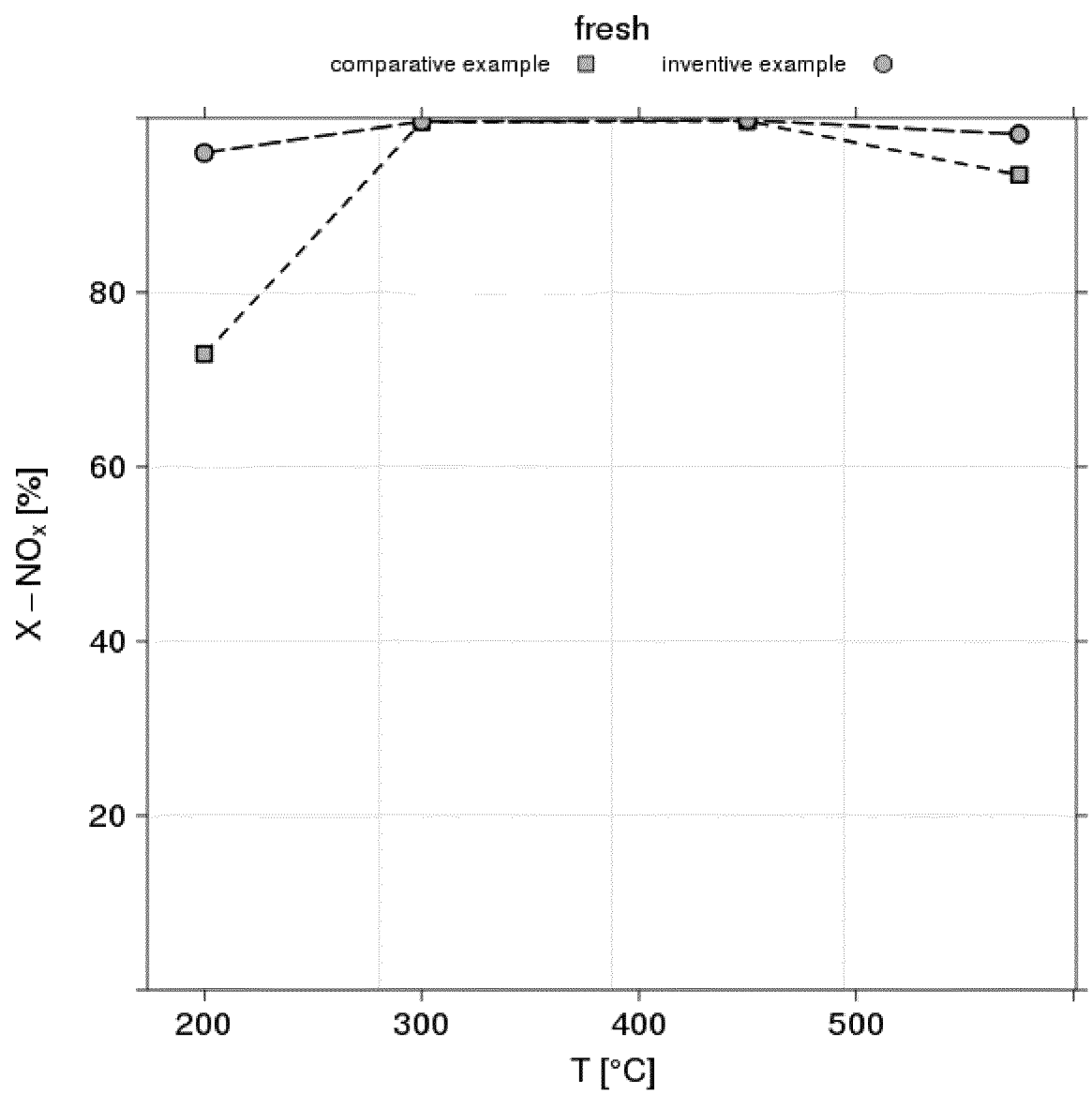
FIG. 6 displays the results from selective catalytic reduction testing of Example 2 performed on the fresh samples, wherein the values obtained for the inventive sample is indicated by the symbols "○", and the values for the comparative sample by the symbols "□". In the figure, the NOx conversion level in % is plotted along the ordinate, and the temperature is shown along the abscissa.
Figure 7:
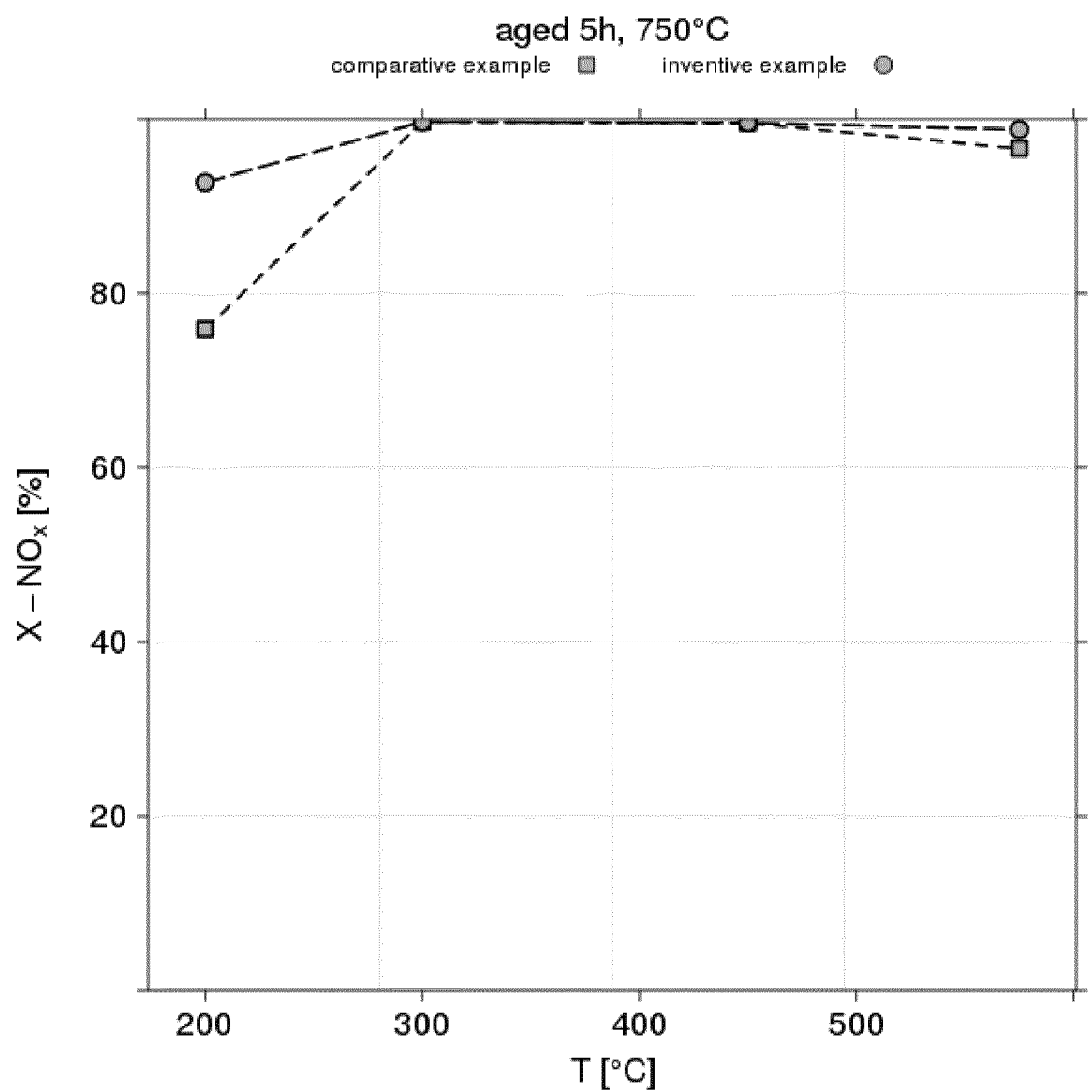
FIG. 7 displays the results from selective catalytic reduction testing of Example 2 performed on the samples after aging at 750° C. for 5 h, wherein the values obtained for the inventive sample is indicated by the symbols "○", and the values for the comparative sample by the symbols "□". In the figure, the NOx conversion level in % is plotted along the ordinate, and the temperature is shown along the abscissa.
Figure 8:
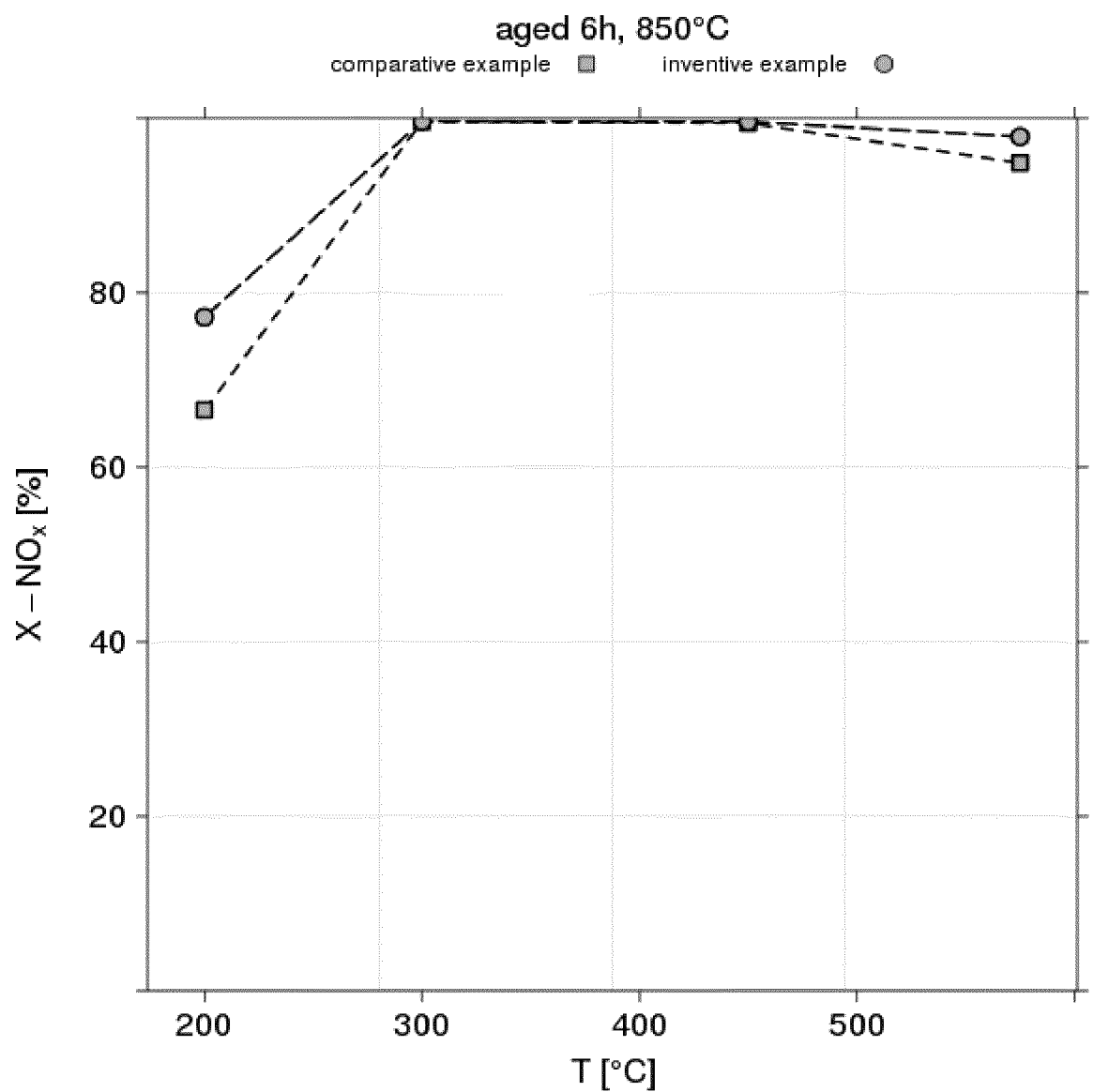
FIG. 8 displays the results from selective catalytic reduction testing of Example 2 performed on the samples after aging at 850° C. for 6 h, wherein the values obtained for the inventive sample is indicated by the symbols "○", and the values for the comparative sample by the symbols "□". In the figure, the NOx conversion level in % is plotted along the ordinate, and the temperature is shown along the abscissa.

The results from the comparative testing experiments prior to and after aging are displayed in FIGS. 6 to 8. Thus, as may be taken from the results from comparative testing, it has quite unexpectedly been found that the catalyst sample prepared using chabazite from the continuous process according to the present invention display substantially higher conversion levels for NOx both in the fresh state (see FIG. 6) as well as after respective aging regimens (see FIGS. 7 and 8, respectively) at low temperatures around 200° C. as well as at high temperatures around 550-600° C. As may be taken from the results in FIG. 6, this surprising technical effect is particularly surprising for the inventive samples at low temperatures after aging at 750° C. (see FIG. 7) and in particular in the fresh state at low SCR temperatures of around 200° C. (see FIG. 6).

Therefore, it has not only unexpectedly been found that a highly efficient process for the continuous production of zeolitic materials may be provided according to the present invention, but that even more, the present invention provides surprisingly improved zeolitic materials not only with respect to their purity and crystallinity, but furthermore with respect to their chemical characteristics which quite unexpectedly surpass conventional materials to a substantial extent.

The invention claimed is:

1. A continuous process for preparing a zeolitic material, the process comprising:
   continuously feeding a mixture comprising a source of $YO_2$, optionally a source of $X_2O_3$, and a liquid solvent system, into a continuous flow reactor at a liquid hourly space velocity in the range of from 0.3 to 20 $h^{-1}$ for a duration of at least 1 h; and
   crystallizing the zeolitic material from the mixture in the continuous flow reactor, the crystallizing comprising heating the mixture to a temperature in a range of from 100 to 300° C. in the continuous flow reactor,
   wherein a volume of the continuous flow reactor is in the range of from 150 $cm^3$ to 75 $m^3$.

2. The process of claim 1, wherein the continuous flow reactor is a tubular reactor, a ring reactor, or a continuously oscillating reactor.

3. The process of claim 1, wherein a wall of the continuous flow reactor comprises a metallic material.

4. The process of claim 1, wherein a surface of the inner wall of the continuous flow reactor is lined with an organic polymer material.

5. The process of claim 1, wherein, in the crystallizing, the mixture is heated under autogenous pressure.

6. The process of claim 1, wherein the continuous flow reactor consists of a single stage.

7. The process of claim 1, wherein no matter is added and/or removed from the reaction mixture during its passage through the continuous flow reactor in the crystallizing.

8. The process of claim 1, further comprising:
   preheating the mixture while feeding the mixture directly into the continuous flow reactor in the continuously feeding.

9. The process of claim 1, further comprising:
   quenching the reaction product effluent continuously exiting the reactor in the crystallizing with a liquid comprising a solvent and/or via expansion of the reaction product effluent;
   and/or,
   isolating the zeolitic material obtained in the crystallizing or quenching;
   and/or,
   washing the zeolitic material obtained in the crystallizing, quenching, or isolating;
   and/or,
   drying the zeolitic material obtained in the crystallizing, quenching, isolating, or washing;
   and/or,
   calcining the zeolitic material obtained in the crystallizing, quenching, isolating, washing, or drying.

10. The process of claim 9, wherein the isolating is performed, and
    wherein a supernatant obtained from the isolating of the zeolitic material, and/or
    wherein a feed having the same composition as the supernatant, is not at any point recycled to the reaction mixture during its passage through the continuous flow reactor.

11. The process of claim 1, wherein Y comprises Si, Sn, Ti, Zr, and/or Ge.

12. The process of claim 1, wherein X comprises Al, B, In, and/or Ga.

13. The process of claim 1, wherein the mixture comprises substantially no phosphorous and/or phosphorous comprising compounds.

14. A zeolitic material, obtained by the process of claim 1.

15. A process, comprising employing the zeolitic material of claim 14 as a molecular sieve, as an adsorbent, for ion-exchange, as a catalyst, and/or as a catalyst support.

16. The process of claim 1, wherein the volume of the continuous flow reactor is in the range of from 175 $cm^3$ to 1 $m^3$.

17. The process of claim 1, wherein the volume of the continuous flow reactor is at least 200 $cm^3$.

18. The process of claim 1, wherein the liquid hourly space velocity is no more than 8 $h^{-1}$.

19. The process of claim 1, wherein the liquid hourly space velocity is in a range of from 4 to 6 $h^{-1}$.

* * * * *